(12) United States Patent
Wang et al.

(10) Patent No.: US 8,806,169 B1
(45) Date of Patent: Aug. 12, 2014

(54) MEMORY MANAGEMENT METHOD, MEMORY MANAGEMENT APPARATUS AND NUMA SYSTEM

(71) Applicant: Huawei Technologies Co., Ltd., Guangdong (CN)

(72) Inventors: Wei Wang, Hangzhou (CN); Jiang Liu, Shenzhen (CN); Xishi Qiu, Hangzhou (CN); Jianguo Wu, Hangzhou (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/094,360

(22) Filed: Dec. 2, 2013

Related U.S. Application Data

(63) Continuation of application No. PCT/CN2013/079892, filed on Jul. 23, 2013.

(30) Foreign Application Priority Data

Feb. 18, 2013 (CN) .......................... 2013 1 0052291

(51) Int. Cl.
*G06F 12/00* (2006.01)

(52) U.S. Cl.
USPC .......................................... 711/170; 711/154

(58) Field of Classification Search
USPC ................................................. 711/154, 170
See application file for complete search history.

(56) References Cited

U.S. PATENT DOCUMENTS

| 2002/0038408 | A1 | 3/2002 | Metayer et al. |
| 2009/0077326 | A1 | 3/2009 | Motohashi |

FOREIGN PATENT DOCUMENTS

| CN | 1347034 A | 5/2002 |
| CN | 101158927 A | 4/2008 |
| CN | 101246466 A | 8/2008 |
| CN | 101478567 A | 7/2009 |
| CN | 101479567 A | 7/2009 |
| CN | 102439570 A | 5/2012 |
| CN | 103136110 A | 6/2013 |

*Primary Examiner* — Matthew Bradley
(74) *Attorney, Agent, or Firm* — Leydig, Voit & Mayer, Ltd.

(57) ABSTRACT

Embodiments of the present invention provide a memory management method, a memory management apparatus and a NUMA system. The memory management method includes: determining, according to a memory demand information which includes memory demand information sent by a processor, whether a memory controller meeting the memory demand information exists in a local processing node which the processor; and if exists, determining, in the memory controller meeting the memory demand information, a memory management area meeting the memory demand information, and allocating the memory management area meeting the memory demand information to the processor. Therefore, the memory controller and the memory management area do not need to be determined in a processing node that does not meet the requirements, which can rapidly find a storing area meeting the requirements, and improve the memory allocation efficiency.

20 Claims, 15 Drawing Sheets

MEMORY MANAGEMENT METHOD, MEMORY MANAGEMENT APPARATUS AND NUMA SYSTEM

CROSS-REFERENCE TO RELATED APPLICATIONS

This application is a continuation of International Patent Application No. PCT/CN2013/079892, filed on Jul. 23, 2013, which claims priority to Chinese Patent Application No. 201310052291.4, filed on Feb. 18, 2013, both of which are hereby incorporated by reference in their entireties.

TECHNICAL FIELD

Embodiments of the present invention relate to computer technologies, and in particular, to a memory management method, a memory management apparatus and a NUMA system.

BACKGROUND

With the rapid development of computer technologies, a data processing capacity of a computer is required by people to be increasingly improved. It is urgently required to form multiple processors into a distributed system, and a Non Uniform Memory Access (NUMA) technology is a distributed system.

A NUMA system connects several processing nodes to form a multi-processor server system by using a high-speed private network. Each processing node is formed by several CPUs or a Symmetrical Multi-Processing (SMP) system, so as to improve the data processing capacity. To conveniently manage a memory of the NUMA system, according to an existing memory management technology, the NUMA memory system is simply divided into two layers, that is, a node and a management area. The node controls and manages a group of memory areas with an access delay, and the management area belongs to a part in the node. All the management areas in the system constitute a linked list. When a certain management area is out of memory, a memory management system may search in the linked list successively until a node and a management area meeting requirements are found. However, the NUMA system is becoming larger gradually, the number of nodes processed by the NUMA system and a memory size are becoming larger accordingly, the linked list of the management area that needs to be maintained is also becoming larger, therefore, a process for searching for the management area meeting the requirements may go through the whole linked list of the management area, which thereby lead to the lower memory allocation and management efficiency.

SUMMARY

Embodiments of the present invention provide a memory management method, a memory management apparatus and a NUMA system, which are used to improve the memory management efficiency.

According to a first aspect, an embodiment of the present invention provides a memory management method, which includes: receiving a memory allocation request message sent by a processor, where the memory allocation request message includes memory demand information; determining, according to the memory demand information and memory attribute information of a local node of the processor, whether a memory unit corresponding to the local node meets the memory demand information; if the memory unit corresponding to the local node of the processor meets the memory demand information, determining a memory controller meeting the memory demand information and in the local node according to the memory demand information and first management information corresponding to the local node, where the first management information includes an identifier of a memory controller in the local node and memory attribute information of the memory controller; determining at least one piece of second management information corresponding to the memory controller according to the identifier of the memory controller meeting the memory demand information, and determining a memory management area meeting the memory demand information and in the memory controller according to the memory demand information and the at least one piece of second management information, where the second management information includes an identifier of a memory unit corresponding to the memory controller and attribute information of the memory unit; and allocating memory space corresponding to the memory management area to the processor according to an identifier of the memory management area meeting the memory demand information.

With reference to the first aspect, in a first possible implementation manner, the method further includes: determining the first second management information corresponding to the memory controller according to the identifier of the memory controller meeting the memory demand information, and determining the memory management area meeting the memory demand information and in the memory controller according to the memory demand information and the first second management information, where the first second management information includes an identifier of a memory management area corresponding to the memory controller and memory attribute information of the memory management area.

With reference to the first aspect, in a second possible implementation manner, the method further includes: determining the first second management information corresponding to the memory controller according to the identifier of the memory controller meeting the memory demand information, and determining a memory module meeting the memory demand information and in the memory controller according to the memory demand information and the first second management information, where the first second management information includes an identifier of a memory module corresponding to the memory controller and memory attribute information of the memory module; and determining second second management information corresponding to the memory module according to the identifier of the memory module meeting the memory demand information, and determining a memory management area meeting the memory demand information and in the memory module according to the memory demand information and the second second management information, where the second second management information includes an identifier of a memory management area corresponding to the memory module and the memory attribute information of the memory management area.

With reference to the first aspect or the first possible implementation manner of the first aspect or the second possible implementation manner of the first aspect, in a third possible implementation manner, the method further includes: if the memory unit corresponding to the local node of the processor does not meet the memory demand information, determining a node group meeting the memory demand information according to the memory demand information and third management information, where the third management information includes an identifier of a node group and memory attribute information of the node group; determining fourth management information corresponding to the node group according to the identifier of the node group meeting the memory demand information, and determining a node meeting the memory demand information and in the node group according to the memory demand information and the fourth management information, where the fourth management information includes an identifier of a node in the node group and memory attribute information of the node.

With reference to the first aspect, the first possible implementation manner of the first aspect, the second possible implementation manner of the first aspect or the third possible implementation manner of the first aspect, in a fourth possible implementation manner, the method further includes: receiving a memory controller offline message sent by the processor, where the memory controller offline message includes an identifier of a memory controller to go offline; obtaining, according to the identifier of the memory controller to go offline, a type of a memory area corresponding to the memory controller to go offline; if the type of the memory area is a non-floating area, migrating data information in the memory area corresponding to the memory controller to go offline to an idle memory area, and recording the identifier of the memory controller to go offline and memory migration information corresponding to the memory controller to go offline; and performing offline processing on the memory controller to go offline.

With reference to the first aspect, the first possible implementation manner of the first aspect, the second possible implementation manner of the first aspect, the third possible implementation manner of the first aspect or the fourth possible implementation manner of the first aspect, in a fifth possible implementation manner, the method further includes: receiving a memory controller online message sent by the processor, where the memory controller online message includes an identifier of a memory controller to go online; obtaining, according to the identifier of the memory controller to go online, memory migration information of the memory controller to go online; migrating, according to the memory migration information of the memory controller to go online, data information in a memory area corresponding to the memory controller to go online back to the memory area corresponding to the memory controller to go online; and performing online processing on the memory controller to go online.

According to a second aspect, an embodiment of the present invention provides a memory management apparatus, and the apparatus includes a first receiving module, configured to receive a memory allocation request message sent by a processor, where the memory allocation request message includes memory demand information, and send the memory allocation request message to a node management module; the node management module, configured to receive the memory allocation request message sent by the first receiving module, and determine, according to the memory demand information in the memory allocation request message and memory attribute information of a local node of the processor, whether a memory unit corresponding to the local node meets the memory demand information; a memory controller management module, configured to, if the memory unit corresponding to the local node of the processor meets the memory demand information, determine a memory controller meeting the memory demand information and in the local node according to the memory demand information and first management information corresponding to the local node, where the first management information includes an identifier of a memory controller in the local node and memory attribute information of the memory controller, and send the identifier of the memory controller meeting the memory demand information to a memory management area management module; the memory management area management module, configured to receive the identifier of the memory controller meeting the memory demand information and sent by the memory controller management module, determine at least one piece of second management information corresponding to the memory controller according to the identifier of the memory controller, determine a memory management area meeting the memory demand information and in the memory controller according to the memory demand information and the at least one piece of second management information, where the second management information includes an identifier of a memory unit corresponding to the memory controller and attribute information of the memory unit, and send an identifier of the memory management area meeting the memory demand information to a memory allocation module; and the memory allocation module, configured to receive the identifier of the memory management area meeting the memory demand information and sent by the memory management area management module, and allocate memory space corresponding to the memory management area to the processor according to the identifier of the memory management area.

With reference to the second aspect, in a first possible implementation manner, the memory management area management module is specifically configured to: determine the first second management information corresponding to the memory controller according to the identifier of the memory controller meeting the memory demand information, and determine the memory management area meeting the memory demand information and in the memory controller according to the memory demand information and the first second management information, where the first second management information includes an identifier of a memory management area corresponding to the memory controller and memory attribute information of the memory management area.

With reference to the second aspect, in a second possible implementation manner, the memory management area management module specifically includes: a memory module management unit, configured to determine the first second management information corresponding to the memory controller according to the identifier of the memory controller meeting the memory demand information, and determine a memory module meeting the memory demand information and in the memory controller according to the memory demand information and the first second management information, where the first second management information includes an identifier of a memory module corresponding to the memory controller and memory attribute information of the memory module; a memory management area management unit, configured to determine second second management information corresponding to the memory module according to the identifier of the memory module meeting the memory demand information, and determine the memory management area meeting the memory demand information and in the memory module according to the memory demand information and the second second management information, where the second second management information includes an identifier of a memory management area corresponding to the memory module and the memory attribute information of the memory management area.

With reference to the second aspect, and the first possible implementation manner of the second aspect or the second possible implementation manner of the second aspect, in a third possible implementation manner, the apparatus further includes: a node group management module, configured to, if the memory unit corresponding to the local node of the processor does not meet the memory demand information, determine a node group meeting the memory demand information according to the memory demand information and fifth management information, where the fifth management information includes an identifier of a node group and memory attribute information of the node group; the node management module is further configured to determine sixth management information corresponding to the node group according to the identifier of the node group meeting the memory demand information, and determine a node meeting the memory demand information and in the node group according to the memory demand information and the sixth management information, where the sixth management information includes an identifier of a node in the node group and memory attribute information of the node.

With reference to the second aspect, the first possible implementation manner of the second aspect, the second possible implementation manner of the second aspect or the third possible implementation manner of the second aspect, in a fourth possible implementation manner, the apparatus further includes: a second receiving module, configured to receive a memory controller offline message sent by the processor, where the memory controller offline message includes an identifier of a memory controller to go offline, and send the memory controller offline message to the memory controller management module; the memory controller management module is further configured to receive the memory controller offline message sent by the second receiving module, obtain, according to the identifier of the memory controller to go offline, a type of a memory area corresponding to the memory controller to go offline; if the type of the memory area is a non-floating area, migrate data information in the memory area corresponding to the memory controller to go offline to an idle memory area, and record the identifier of the memory controller to go offline and memory migration information corresponding to the memory controller; and perform offline processing on the memory controller to go offline.

With reference to the second aspect, the first possible implementation manner of the second aspect, the second possible implementation manner of the second aspect, the third possible implementation manner of the second aspect or the fourth possible implementation manner, in a fifth possible implementation manner, the apparatus further includes: a third receiving module, configured to receive a memory controller online message sent by the processor, where the memory controller online message includes an identifier of a memory controller to go online, and send the memory controller offline message to the memory controller management module; the memory controller management module is further configured to receive the memory controller online message sent by the third receiving module, obtain, according to the identifier of the memory controller to go online, memory migration information of the memory controller to go online; migrate data information in the memory area corresponding to the memory controller to go online back to the memory area corresponding to the memory controller to go online according to the memory migration information of the memory controller to go online; and perform online processing on the memory controller to go online.

According to a third aspect, an embodiment of the present invention further provides a NUMA system, and the system includes a memory management apparatus and at least one node. The node includes at least one memory controller and at least one processor, and a communications connection exists between the memory controller and the processor; the memory management apparatus is the memory management apparatus according to any one of the foregoing embodiments of the present invention, and is configured to receive a memory allocation request message sent by the processor, where the memory allocation request message includes memory demand information; determine, according to the memory demand information and memory attribute information of a local node of the processor, whether a memory unit corresponding to the local node meets the memory demand information; if the memory unit corresponding to the local node of the processor meets the memory demand information, determine a memory controller meeting the memory demand information and in the local node according to the memory demand information and first management information corresponding to the local node, where the first management information includes an identifier of a memory controller in the local node and memory attribute information of the memory controller; determine at least one piece of second management information corresponding to the memory controller according to the identifier of the memory controller meeting the memory demand information, and determine a memory management area meeting the memory demand information and in the memory controller according to the memory demand information and the at least one piece of second management information, where the second management information includes an identifier of a memory unit corresponding to the memory controller and attribute information of the memory unit; and allocate memory space corresponding to the memory management area to the processor according to an identifier of the memory management area meeting the memory demand information.

It can be seen that, according to the memory management method, the memory management apparatus and the NUMA system provided in the embodiments of the present invention, the memory allocation request message sent by the processor is received, whether the memory controller meeting the request message exists in the local node is determined according to the memory demand information in the memory allocation request message, the memory controller meeting the memory demand information is determined in the local node meeting the memory demand information, the memory management area meeting the memory demand information is determined in the memory controller meeting the memory demand information, and the memory management area meeting the memory demand information is allocated to the processor of the memory allocation request message. Therefore, the memory controller and the memory management area do not need to be determined in the node that does not meet requirements, thereby a storing area meeting the requirements can be rapidly found, and the memory management efficiency is improved.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
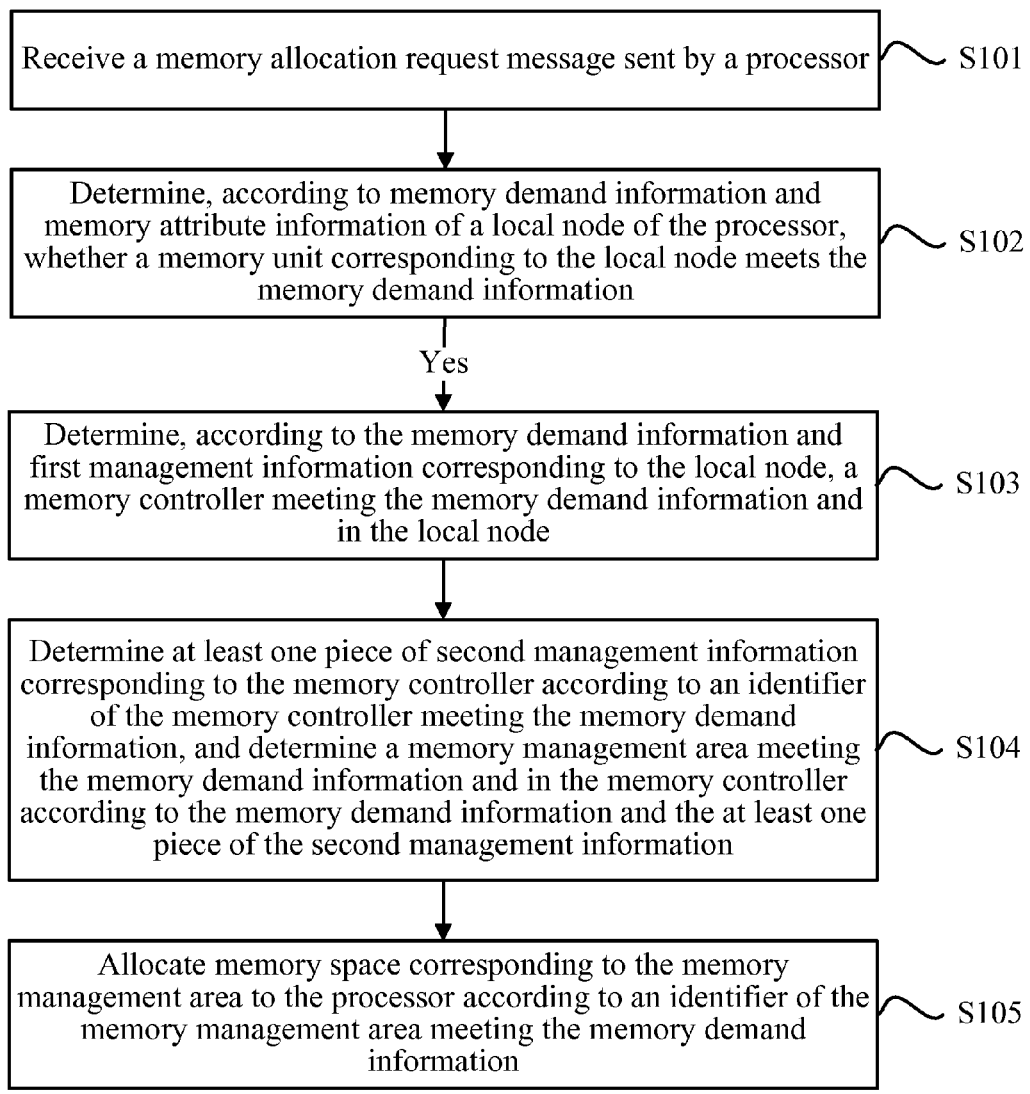
FIG. 1 is a schematic flow chart of a memory allocation method provided in an embodiment of the present invention.

FIG. 1 is a schematic flow chart of a memory allocation method provided in an embodiment of the present invention. The method may be applied to a memory management apparatus. The memory management apparatus may be located on a node of a NUMA system, and may serve as a part of an operating system, or may separately serve as an independent physical apparatus. As shown in FIG. 1, the method includes the following steps.

S101: Receive a memory allocation request message sent by a processor, where the memory allocation request message includes memory demand information.

S102: Determine, according to the memory demand information and memory attribute information of a local node of the processor, whether a memory unit corresponding to the local node meets the memory demand information.

The memory unit herein may be any memory storage unit in the local node, such as a memory management area, a memory module, a memory unit corresponding to a memory controller.

S103: If the memory unit corresponding to the local node of the processor meets the memory demand information, determine, according to the memory demand information and first management information corresponding to the local node, a memory controller meeting the memory demand information and in the local node, where the first management information includes an identifier of a memory controller in the local node and memory attribute information of the memory controller.

S104: Determine at least one piece of second management information corresponding to the memory controller according to the identifier of the memory controller meeting the memory demand information, and determine a memory management area meeting the memory demand information and in the memory controller according to the memory demand information and the at least one piece of second management information, where the second management information includes an identifier of a memory unit corresponding to the memory controller and attribute information of the memory unit.

The memory unit herein may be a memory module or memory management area.

S105: Allocate memory space corresponding to the memory management area to the processor according to an identifier of the memory management area meeting the memory demand information.

Figure 2A:
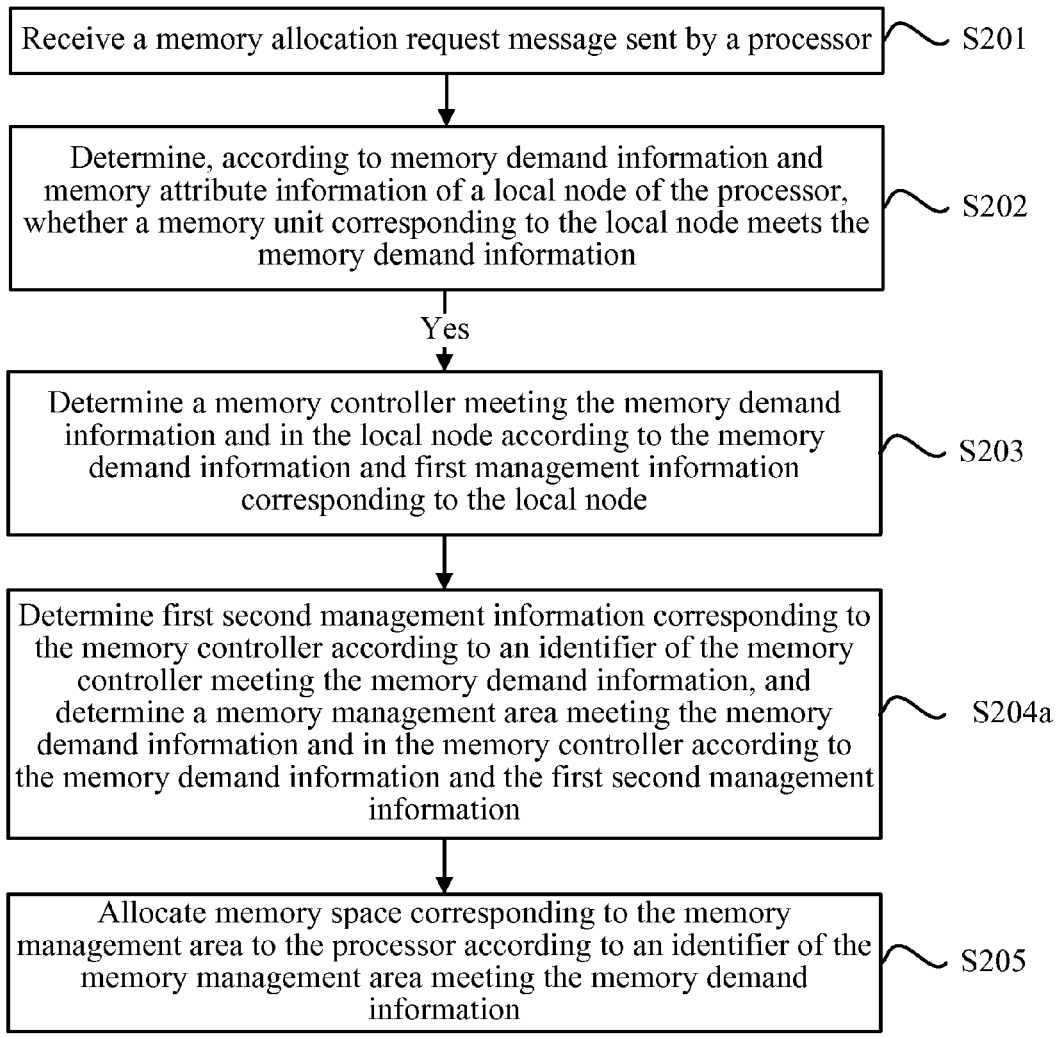
FIG. 2a is a schematic flow chart of another memory allocation method provided in an embodiment of the present invention.

FIG. 2a is a schematic flow chart of another memory allocation method provided in an embodiment of the present invention. The method may be applied to a memory management apparatus. The memory management apparatus may be located on a node of a NUMA system, and may serve as a part of an operating system, or may separately serve as an independent physical apparatus. As shown in FIG. 2a, the memory allocation method provided in the embodiment of the present invention includes the following steps.

S201: Receive a memory allocation request message sent by a processor, where the memory allocation request message includes memory demand information.

Specifically, for example, in the NUMA system, when executing a program, a processor of the node needs to apply for a memory area to cache program code. The processor sends the memory allocation request message to the memory management apparatus of the system according to a demand of the processor, where the request message includes memory demand information of the memory area applied for by the processor, and the memory demand information may include: a size of the memory area, and in addition, may further include a type of the memory area. The type of the memory area may be divided into a floating area (which is also referred to as portable memory) and a non-floating area (which is also referred to as non-portable memory). Data stored in the floating area is generally temporary data, and data stored in the non-floating area is generally data saved for a long time. For example, the demand information included in the memory allocation request message sent by the processor of a certain node is: 200 KB and the non-portable memory, which indicates that the processor requests to allocate a memory area that has a size of 200 KB and whose memory area type is a non-floating area.

S202: Determine, according to the memory demand information and memory attribute information of a local node of the processor, whether a memory unit corresponding to the local node meets the memory demand information.

The local node is a node to which the processor belongs.

In an implementation manner, if the memory demand information includes a size of a required memory area, the memory attribute information may include a size of a remaining memory area. The memory attribute information of the local node includes the size of the remaining memory area of the local node. If the size of the remaining memory area meets the size of the required memory area in the memory demand information, it is determined that the memory unit corresponding to the local node meets the memory demand information.

In another implementation manner, if the memory demand information includes the size of the required memory area and a type of the required memory area, the memory attribute information may include the size of the remaining memory area and a type of the remaining memory area.

It should be noted that, the node in the embodiment of the present invention may be one physical computing node, or may logically be multiple physical computing nodes. The "memory unit" in the embodiment of the present invention includes remaining memory space on one node or multiple nodes, remaining memory space managed by a memory controller, remaining memory space corresponding to a memory module, or remaining memory space corresponding to a memory management area.

S203: If the memory unit corresponding to the local node of the processor meets the memory demand information, determine a memory controller meeting the memory demand information and in the local node according to the memory demand information and first management information corresponding to the local node.

The first management information includes an identifier of the memory controller in the local node and memory attribute information of the memory controller. For the memory demand information and the memory attribute information herein, reference may be made to step 102.

Specifically, by querying the first management information, if the memory demand information matches with memory attribute information of a certain memory controller in the local node, which may specifically be that the size of the remaining memory area of the memory controller is greater than or equal to the size of the required memory area, and the type of the remaining memory area also meets the type of the required memory area, it is determined that the memory controller is a memory controller meeting the memory demand information.

S204a: Determine the first second management information corresponding to the memory controller according to the identifier of the memory controller meeting the memory demand information, and determine a memory management area meeting the memory demand information and in the memory controller according to the memory demand information and the first second management information, where the first second management information includes an identifier of a memory management area corresponding to the memory controller and memory attribute information of the memory management area.

Each memory controller is corresponding to respective first second management information, where the first second management information includes the identifier of a memory management area corresponding to the memory controller and the memory attribute information of the memory management area. Each memory controller is corresponding to respective one or more memory management areas, and the memory management area is the smallest unit of the memory unit.

S205: Allocate memory space corresponding to the memory management area to the processor according to the identifier of the memory management area meeting the memory demand information.

Using 200K required memory in the memory demand information as an example, it is firstly determined whether the remaining memory area in the local node is greater than or equal to 200K; if greater than or equal to, a corresponding memory controller that has the remaining memory space greater than or equal to 200K is found in the memory controller in the local node, then a memory management area greater than or equal to 200K is found in the memory management area corresponding to the memory controller, and eventually, the memory space corresponding to the memory management area is allocated to the processor.

It can be seen that, in the embodiment, the memory allocation request message sent by the processor is received, whether a memory controller meeting the request message exists in a local processing node is determined according to the memory demand information, the memory controller meeting a request is determined in the local processing node meeting the request message, the memory management area meeting the request message is determined in the memory controller meeting the request message, and the memory management area meeting the request message is allocated to the processor that sends the request message. Therefore, there is no need to search in a linked list of the memory controller of other processing nodes and a linked list of the management area, thereby narrowing down a search scope, reducing search time, and improving the memory allocation efficiency.

Figure 2B:
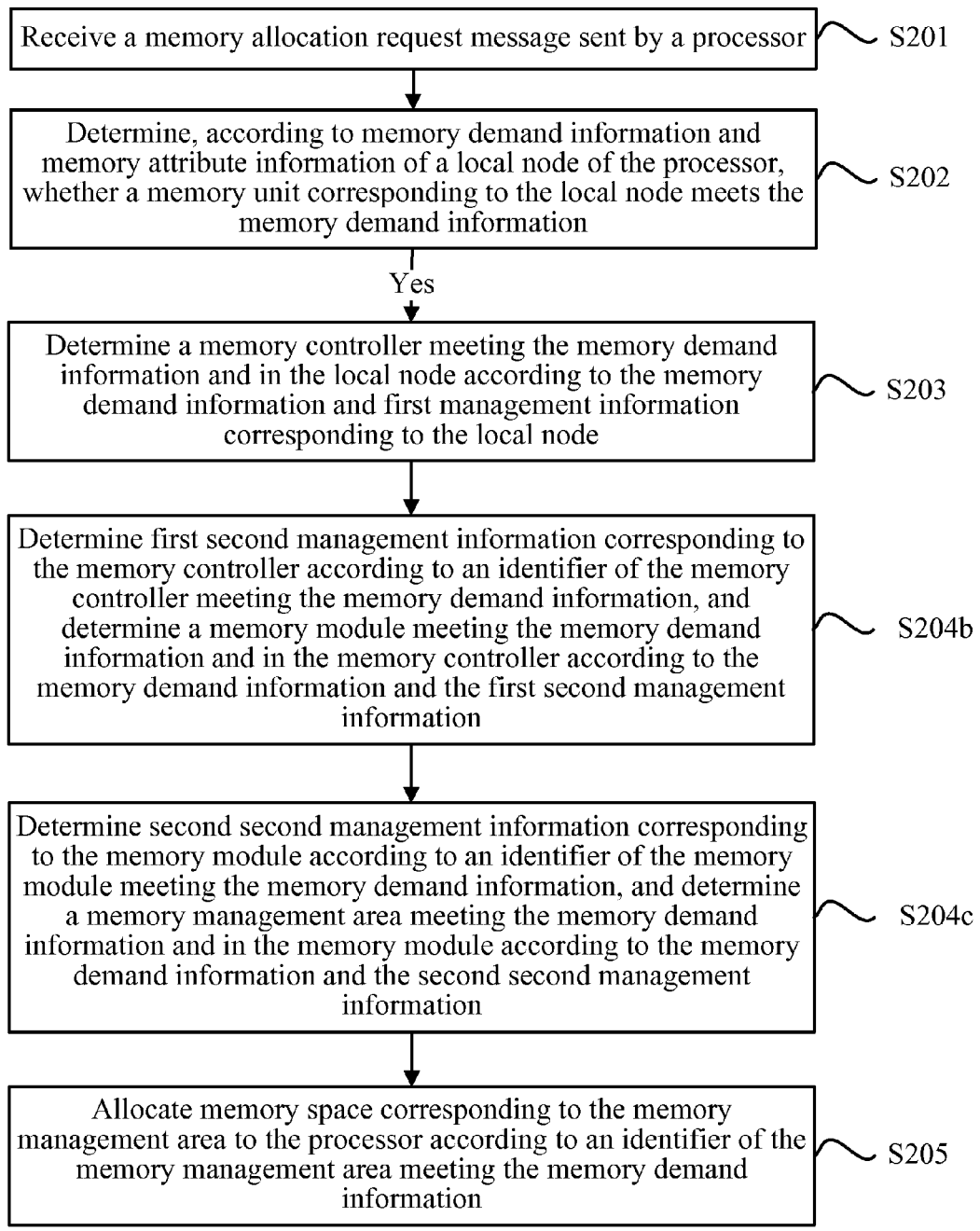
FIG. 2b is a schematic method flow chart of another memory allocation method provided in an embodiment of the present invention.

FIG. 2b is a schematic method flow chart of another memory allocation method provided in an embodiment of the present invention. As shown in FIG. 2b, the method includes the following steps, where steps S201 to S203 and S205 are similar to the embodiment shown in FIG. 2a, and details are not described herein again.

The method further includes the following steps.

S204b: Determine the first second management information corresponding to the memory controller according to the identifier of the memory controller meeting the memory demand information, and determine a memory module meeting the memory demand information and in the memory controller according to the memory demand information and the first second management information, where the first second management information includes an identifier of a memory module corresponding to the memory controller and memory attribute information of the memory module; and S204c: Determine second second management information corresponding to the memory module according to the identifier of the memory module meeting the memory demand information, and determine a memory management area meeting the memory demand information and in the memory module according to the memory demand information and the second second management information, where the second second management information includes an identifier of a memory management area corresponding to the memory module and memory attribute information of the memory management area.

Different from the embodiment shown in FIG. 2a, what the memory controller in FIG. 2b directly corresponds to is the memory module, and different memory modules further correspond to different memory management areas, which thereby further narrows down a memory search scope, reducing search time, and improving the memory allocation efficiency.

Figure 3:
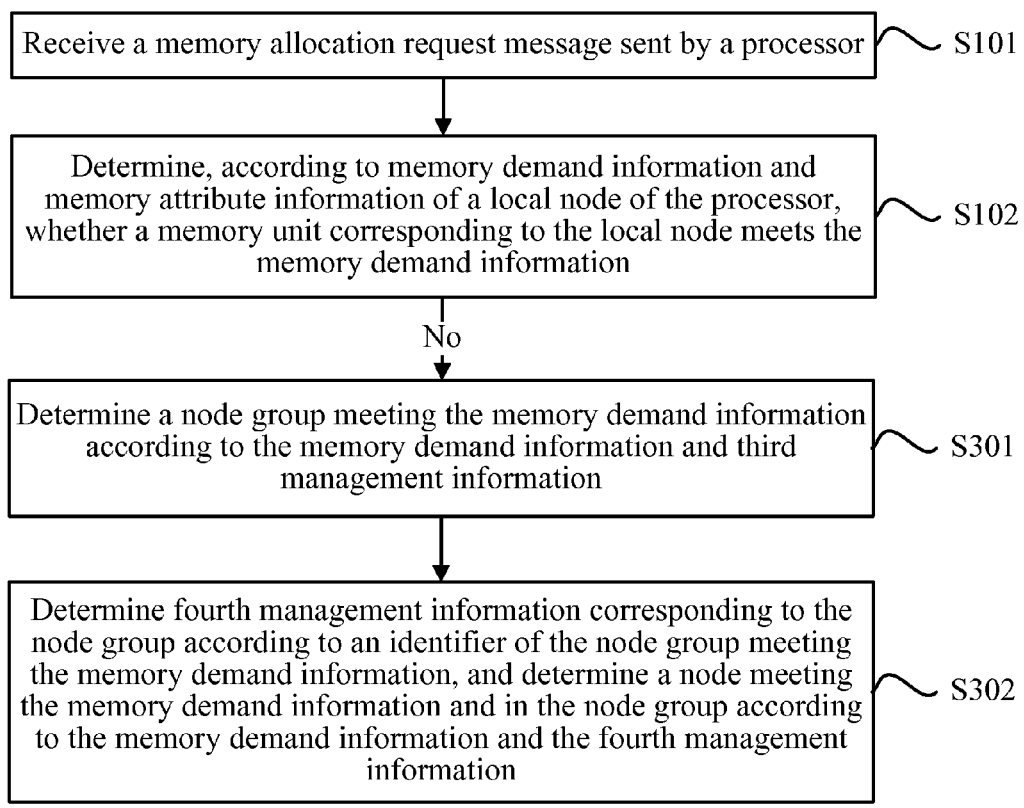
FIG. 3 is a schematic method flow chart of another memory allocation method provided in an embodiment of the present invention.

Based on the foregoing embodiment, further, as shown in FIG. 3, a memory allocation method provided in the embodiment of present invention further includes the following steps.

S301: If a memory unit corresponding to a local node of a processor does not meet memory demand information, determine a node group meeting the memory demand information according to the memory demand information and third management information, where the third management information includes an identifier of a node group and memory attribute information of the node group.

S302: Determine fourth management information corresponding to the node group according to the identifier of the node group meeting the memory demand information, and determine a node meeting the memory demand information and in the node group according to the memory demand information and the fourth management information, where the fourth management information includes an identifier of a node in the node group and memory attribute information of the node.

Specifically, after receiving a memory allocation request message of the processor, if the memory management apparatus determines, according to memory attribute information of the local node, that remaining memory of the local node cannot meet required memory, the node group meeting the memory demand information is determined according to the third management information, where the third management information includes identifiers of multiple node groups, and memory attribute information corresponding to each node group; the node group meeting memory demands is determined according to the third management information, and then which node in the node group meeting the memory demands is determined according to the fourth management information corresponding to the node group meeting the memory demands.

The "first" and "second" in the embodiment of the present invention are only used for distinguishing. Without special explanations, there is no limitation to a sequence. The management information in the embodiment of the present invention may be implemented as a linked list, or may also be implemented as an array, or other types of data structures, which is not limited according to the embodiment of the present invention.

Specifically, the memory management apparatus searches in a linked list (corresponding to the fourth management information) of the node in the node group meeting the memory demands. The node linked list is a node linked list of the node formed by the identifier of the node belonging to the node group and the memory attribute information. Which node meeting the memory demands and in the node group is determined according to the memory attribute information of the node in the node linked list, and the node identifier corresponding to the node is returned.

After the node meeting the memory demands is found, the memory management area may be searched for in the node meeting the memory demands with reference to the method of the foregoing embodiment (FIG. 2a or FIG. 2b).

It can be seen that, in a memory management manner of adding a layer according to the embodiment of the present invention, a memory management area meeting the requirements may be found rapidly when a large number of nodes and a large number of memory systems do not have sufficient memory to be allocated, instead of going through the whole memory area linked list, which improves the memory allocation efficiency.

A memory management method provided in the embodiment of the present invention may include, but is not limited to the memory allocation method, a memory online method and a memory offline method.

Figure 4A:
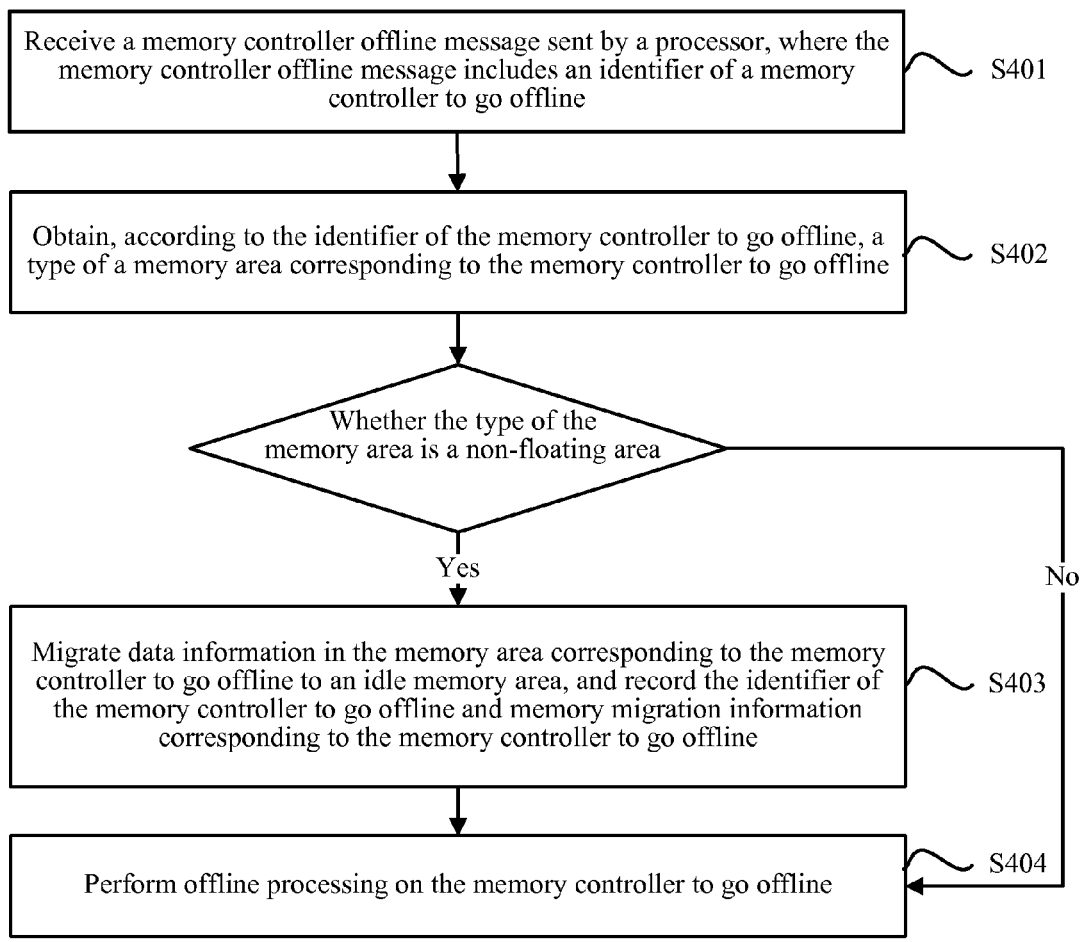
FIG. 4a is a schematic method flow chart of a memory offline method provided in an embodiment of the present invention.

FIG. 4a is a schematic method flow chart of a memory offline method provided in the embodiment of the present invention. The method may be applied to a memory management apparatus. The method and the memory allocation methods provided in the foregoing embodiments are not limited to a sequence. Memory allocation and memory online and offline belong to memory management. As shown in FIG. 4a, the memory offline method in the embodiment includes the following steps.

Step 401: Receive a memory controller offline message sent by a processor, where the memory controller offline message includes an identifier of a memory controller to go offline.

Specifically, when an error occurs in a certain memory controller of a NUMA system or a system administrator wishes that when a certain memory controller goes offline, the processor sends the memory controller offline message to the memory management apparatus, where the offline message includes the identifier of the memory controller to go offline.

Step 402: Obtain, according to the identifier of the memory controller to go offline, a type of a memory area corresponding to the memory controller to go offline.

Step 403: If the type of the memory area is a non-floating area, migrate data information in the memory area corresponding to the memory controller to go offline to an idle memory area, and record the identifier of the memory controller to go offline and memory migration information corresponding to the memory controller to go offline.

A size of the idle memory area is greater than or equal to a size of the memory area corresponding to the memory controller to go offline, and a memory controller corresponding to the idle memory area is not the memory controller to go offline.

Specifically, the data information in the memory controller to go offline is copied into the idle memory area; or, the data information is moved from an original memory area to the idle memory area. And, a specific location after the data information in the memory controller to go offline is migrated is recorded so that the memory controller to go offline can migrate data back according to the migration information record when going online again.

The memory controller is corresponding to respective memory attribute information, where the memory attribute information includes the size of the memory area and the type of the memory area corresponding to the memory controller. Therefore, the memory management apparatus may obtain the type of the memory area corresponding to the memory controller according to the memory attribute information corresponding to the memory controller.

Specifically, the memory attribute information corresponding to the memory controller is searched for to determine an idle memory area matching the size of the memory area corresponding to the memory controller to go offline, and the Basic Input Output System (BIOS) is notified to migrate the data information to the idle memory area. More specifically, the memory management apparatus allocates, according to the memory attribute information of the memory controller to go offline, an idle memory area matching the memory controller to go offline. The memory management apparatus may allocate, according to any memory allocation method provided in the foregoing memory allocation method embodiments, an idle memory area whose memory area is greater than or equal to the memory area of the memory controller to go offline. The memory management apparatus may further enable a memory controller to go online, where memory space of the online memory controller is greater than or equal to memory space of the memory area of the memory controller to go offline, and the type of the memory area is the same as the type of the memory area of the memory controller to go offline. After the idle memory area is determined, the BIOS may be instructed to migrate the data information in the memory controller to go offline to the idle memory area.

Step 404: Perform offline processing on the memory controller to go offline.

In another aspect, if the type of the memory area is not a non-floating area, the offline processing is directly performed on the memory controller to go offline.

Figure 4B:
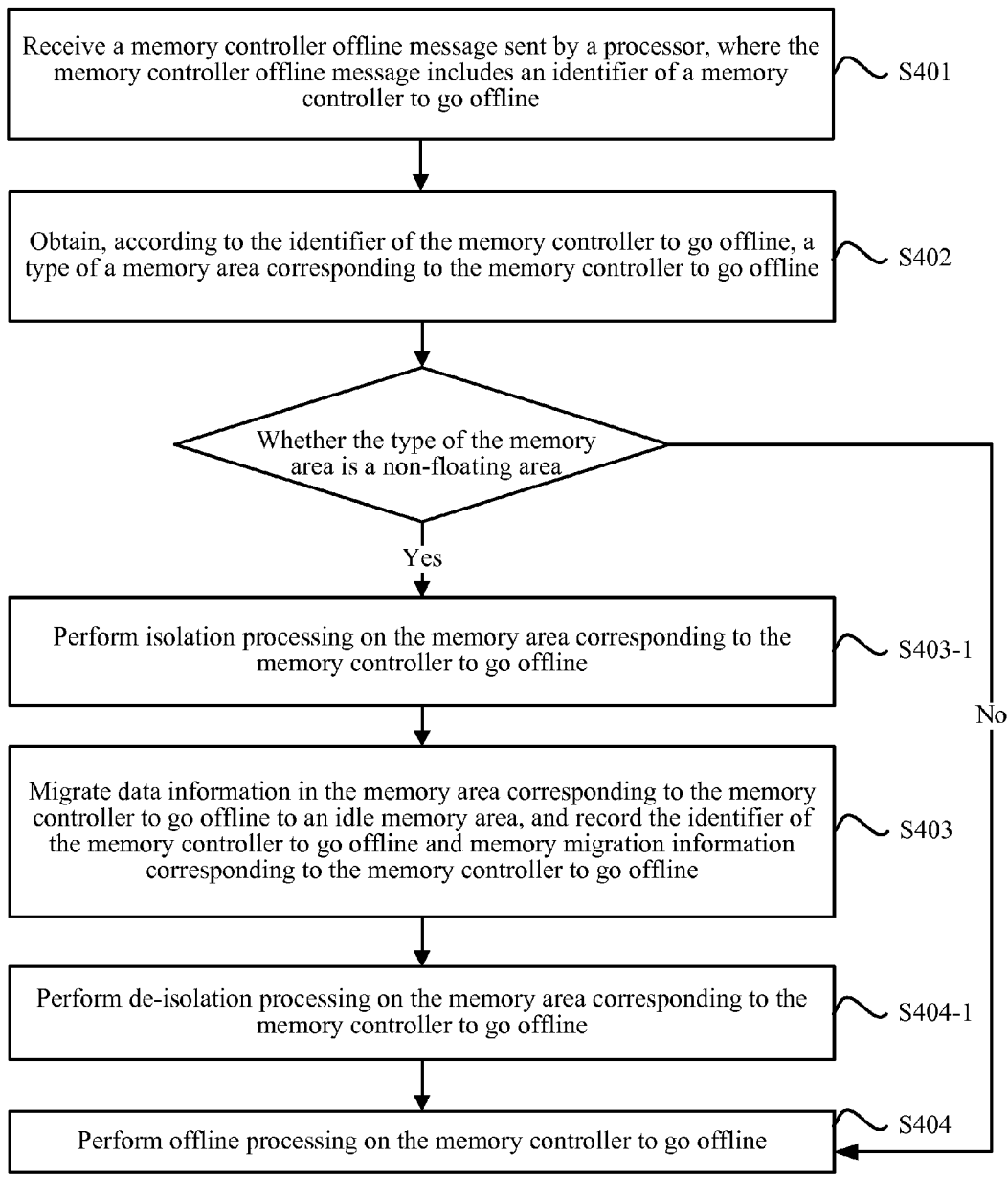
FIG. 4b is a schematic method flow chart of another memory offline method provided in an embodiment of the present invention.

Specifically, if the memory area of the memory controller to go offline is a floating area, there is no need to migrate the data in the memory area of the memory controller to go offline, and the memory controller to go offline may be directly powered off Further, FIG. 4b is a schematic method flow chart of another memory offline method provided in the embodiment of the present invention. As shown in FIG. 4b, the method further includes the following steps.

Step 403-1: Perform isolation processing on the memory area corresponding to the memory controller to go offline.

Specifically, before the data information in the memory controller to go offline is migrated to an idle memory area, it is prohibited to perform allocation or access processing on the memory area of the memory controller to go offline.

Step 404-1: Perform de-isolation processing on the memory area corresponding to the memory controller to go offline.

Specifically, when migrating and recording the data of the memory controller to go offline are completed, the memory controller to go offline is de-isolated.

It can be seen that, according to the memory offline method provided in the embodiment of the present invention, data recording is implemented by recording migration information of the data information of the memory controller to go offline, the data may be migrated back according to the migration information when the memory controller goes online again, improving the search efficiency of the system after the memory controller goes online, and thereby improving efficiency for the system to allocate the memory area of the memory controller.

Figure 5A:
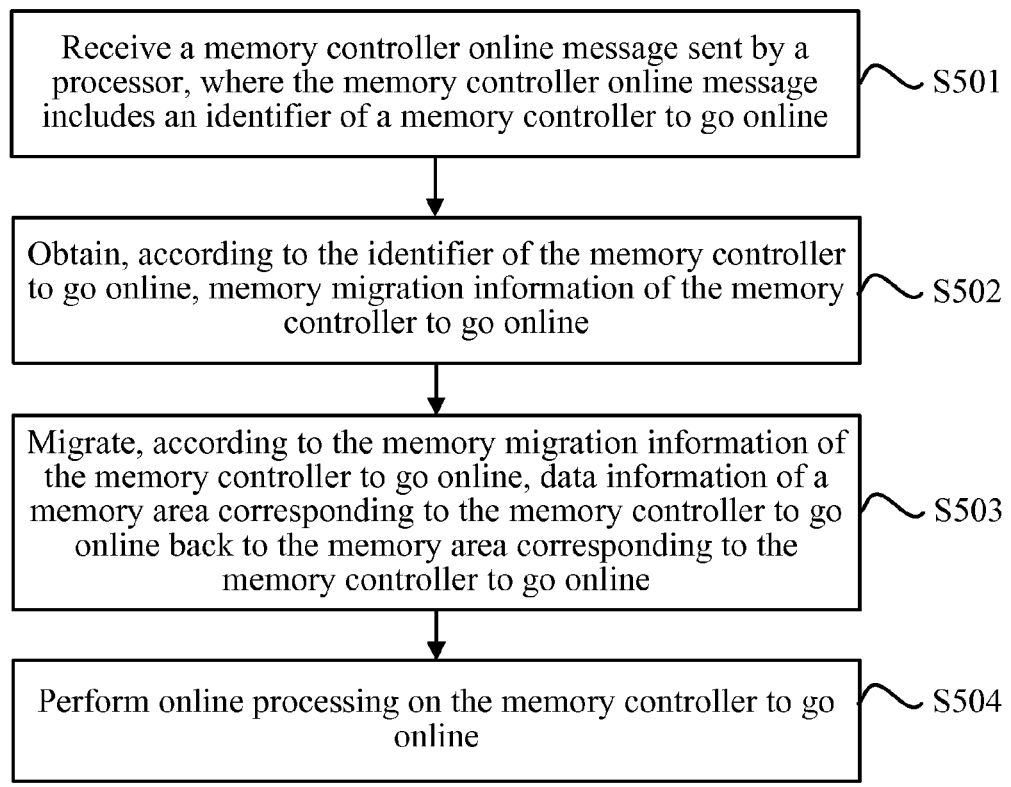
FIG. 5a is a schematic method flow chart of a memory online method provided in an embodiment of the present invention.

FIG. 5a is a schematic method flow chart of a memory online method provided in an embodiment of the present invention. The method may be applied to a certain memory controller forced to go offline. As shown in FIG. 5a, the method includes the following steps.

Step 501: Receive a memory controller online message sent by a processor, where the memory controller online message includes an identifier of a memory controller to go online.

Step 502: Obtain, according to the identifier of the memory controller to go online, memory migration information of the memory controller to go online.

Step 503: Migrate, according to the memory migration information of the memory controller to go online, data information in a memory area corresponding to the memory controller to go online back to the memory area corresponding to the memory controller to go online.

Step 504: Perform online processing on the memory controller to go online.

Figure 5B:
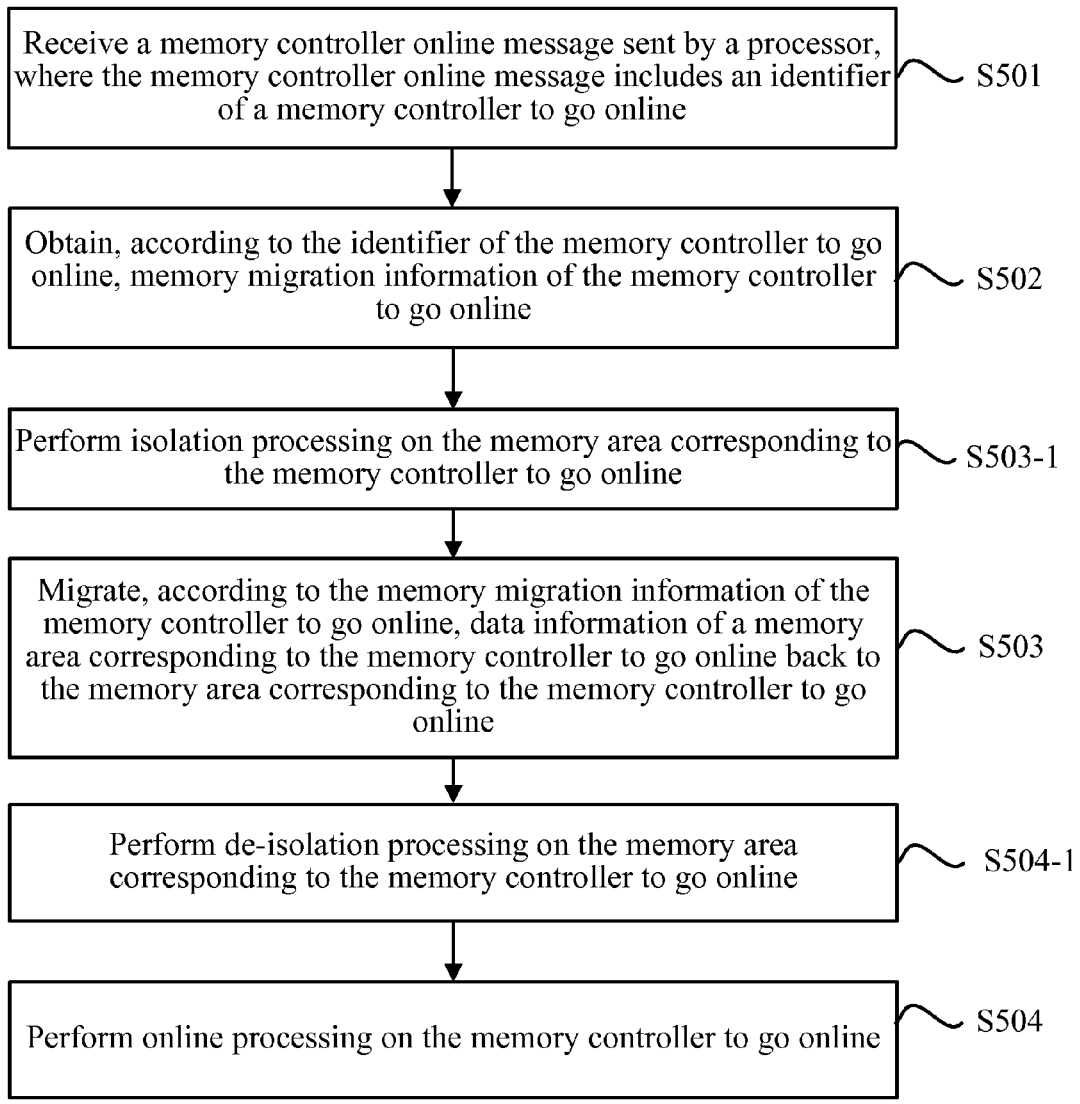
FIG. 5b is a schematic method flow chart of another memory online method provided in an embodiment of the present invention.

Further, as shown in FIG. 5b, the method further includes the following steps.

Step 503-1: Perform isolation processing on the memory area corresponding to the memory controller to go online.

Step 504-1: Perform de-isolation processing on the memory area corresponding to the memory controller to go online.

A specific implementation manner is an adverse operation of the foregoing offline method, which can be easily obtained by persons skilled in the prior art according to the foregoing offline method, and details are not described herein again.

An Reliability Availability and Serviceability (RAS) characteristic is a very important characteristic of mid-range and high-end servers. A memory RAS characteristic is one of the key characteristics therein. Memory mirroring protects important memory from being damaged; memory migration implements hot plug of a memory, and non-volatile memory implements permanent saving of memory data. Memory management of an operating system not only needs to efficiently manage a memory use, but also needs to effectively cooperate with new technologies to implement the RAS characteristic of the memory. By adding memory management layers, and with reference to a memory migration technology, the embodiment of the present invention solves the technical problem of the hot plug of any memory, and also has a small impact on system performance. After the memory is hot plugged, a memory migration record may also be automatically identified, and the memory that is migrated during the hot plug can be selected to migrate back locally, which reduces a remote access delay.

Figure 6:
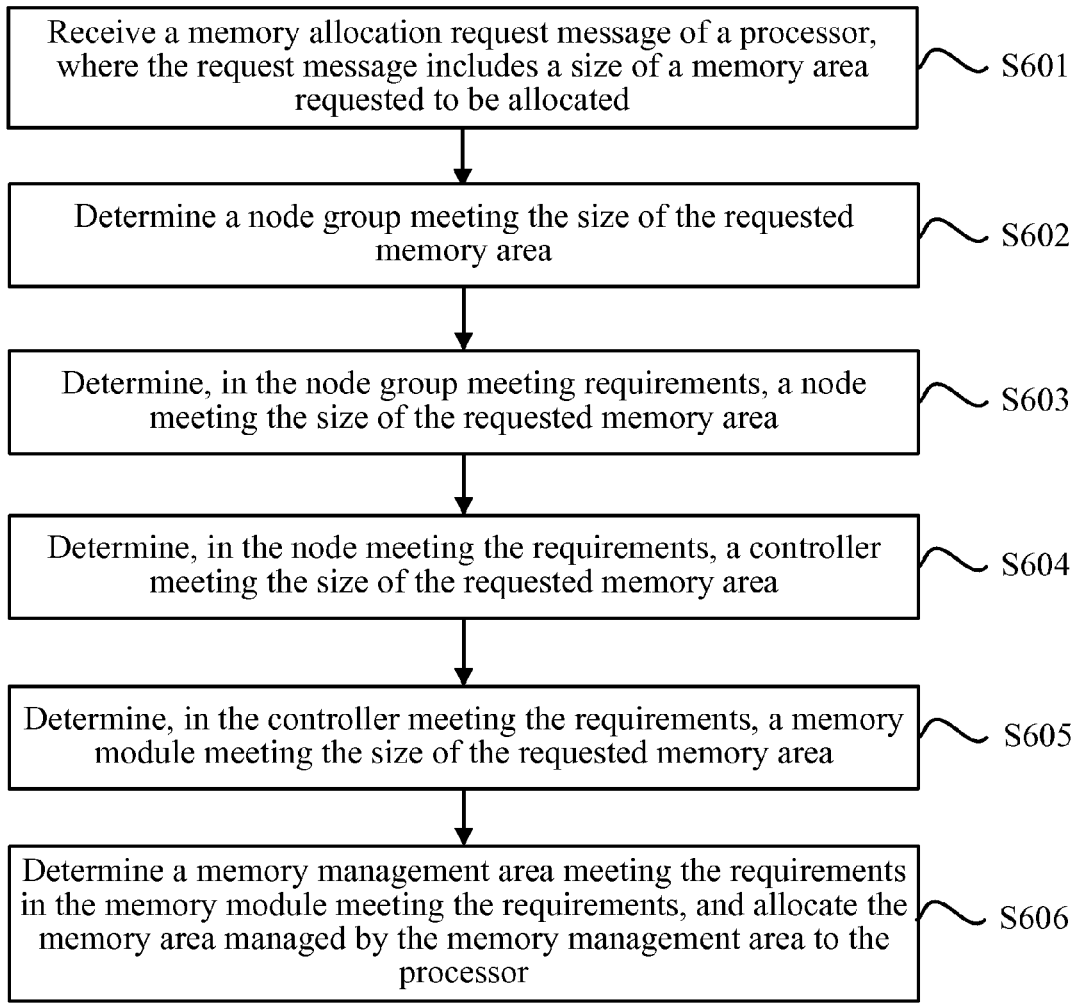
FIG. 6 is schematic method flow chart of a memory allocation method provided in an embodiment of a memory management apparatus of the present invention.

FIG. 6 is schematic method flow chart of a memory allocation method of an embodiment of a memory management apparatus provided in the embodiment of the present invention.

In the embodiment, the memory allocation method is executed by five management modules of the memory management apparatus. The five management modules are responsible for performing management on a memory area of the memory management apparatus, such as memory allocation. The five management modules are, in order: a node group management module, a node management module, a controller management module, a memory module management module and a management area management module, where, the node group management module manages the memory area by using a corresponding node linked list;

the node management module manages a memory area of the node by using a corresponding controller linked list;

the controller management module manages a memory area of a controller by using a corresponding memory module linked list;

the memory module management module manages a memory area of the memory module by using a corresponding management area linked list; and the management area management module manages a memory area of the management area.

When a system is running, a CPU of a certain node requires a 200 KB memory area to store a corresponding instruction. The CPU requests the node group management module of the memory management apparatus to allocate the 200 KB memory area. The method for allocating the memory area by the node group management module for the CPU includes the following steps.

S601: Receive a memory allocation request message of a processor, where the request message includes a size of the memory area requested to be allocated.

Specifically, the node group management module receives the memory allocation request message sent by the processor, where the request message includes the size of the requested memory area, such as 200 KB.

Further, the request message may further include an attribute of the memory area requested to be allocated, and the attribute may be, for example, whether the memory area is a floating area, or for example, the node group management module is requested to allocate a floating memory area with a size of 200 KB.

S602: Determine a node group meeting the size of the requested memory area.

Specifically, the node group management module searches for a current idle memory area of each node group according to the request message, for example, memory attribute information of the node group may be searched for to find the node group that has the current idle memory area greater than or equal to 200 KB. The node group that has the current idle memory area greater than or equal to 200 KB may be a node group with a nearest distance from a local node, or may also be a preset node group, or may further be a preferred node group, which is not limited herein.

S603: Determine, in the node group meeting the requirements, a node meeting the size of the requested memory area.

Specifically, the node management module searches for a node linked list in the foregoing node group meeting the requirements, and determines a node that has a current idle memory area greater than or equal to 200 KB according to attributes, such as the size of the current idle memory area of each node in the node linked list.

S604: Determine, in the node meeting the requirements, a controller meeting the size of the requested memory area.

Specifically, the controller management module searches for a memory controller meeting the requirements in the controller linked list corresponding to the foregoing node meeting the requirements, and determines a controller that has a current idle memory area greater than or equal to 200 KB according to the size of the current idle memory area of each controller in the controller linked list.

S605: Determine, in the controller meeting the requirements, a memory module meeting the size of the requested memory area.

Specifically, the memory module management module searches for the memory module meeting the requirements in the memory module linked list corresponding to the foregoing controller meeting the requirements, and determines a memory module that has a current idle memory area greater than or equal to 200 KB according to the size of the current idle memory area of the memory module in the memory module linked list.

Further, multiple memory modules whose sum of current idle memory areas is greater than or equal to 200 KB may be further determined.

S606: Determine a memory management area meeting the requirements in the memory module meeting the requirements, and allocate the memory area managed by the memory management area to the processor.

Specifically, the memory module management module determines a 200 KB memory management area in the foregoing memory module meeting the requirements, and allocates the 200 KB memory management area to the CPU that sends the memory allocation request message for storing corresponding instructions.

In the embodiment, five-layer management module manages the memory area of the memory management apparatus, the management module in each layer manages the corresponding linked list, and the system searches in order in the modules meeting the requirements to the next layer by searching for the linked list of the corresponding management module, until the memory area meeting the requirements is found and allocated, which improves the memory allocation efficiency.

Further, one area management module may be added to a module management layer for managing the memory area of the memory management apparatus according to a complexity level of the memory management apparatus, and the area management module is configured to manage several node group management modules. In addition, a size of the management area may further be reduced according to the complexity level of the memory management apparatus or the module management layers for managing the memory area of the memory management apparatus may be reduced.

Figure 7:
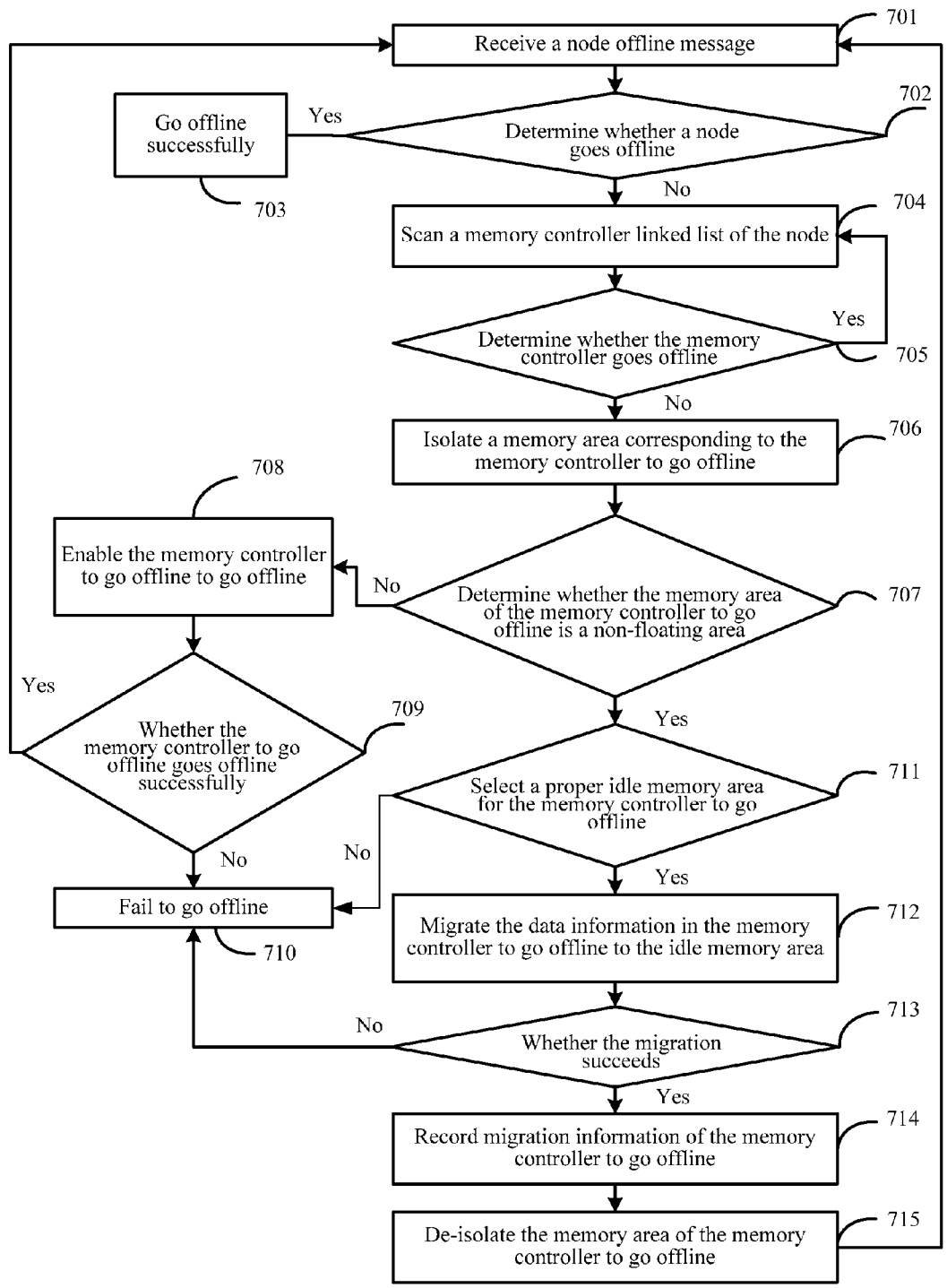
FIG. 7 is a schematic method flow chart of a node offline method provided in an embodiment of the present invention.

FIG. 7 is a schematic method flow chart of a node offline method provided in the embodiment of the present invention, and as shown in FIG. 7, the memory offline method provided in the embodiment includes the following steps.

701: Receive a node offline message.

Specifically, for example, a certain node needs to go offline, a node management module of a memory management apparatus may receive the node offline message, where the node offline message may include an identifier of the node that needs to go offline, and the offline message may further include attribute information that whether the node is a floating area. The floating area may be a memory area with migratable data.

702: Determine whether the node has gone offline, if yes, execute 703; if no, execute 704.

Specifically, the node management module determines whether the node goes offline by searching for the attribute information of the node. If the node has gone offline, execute the following 703; if the node has not gone offline, execute 704.

703: Go offline successfully.

704: Scan a memory controller linked list of the node.

Specifically, the node management module searches for the memory controller linked list of the node, and determines whether a memory controller has gone offline one by one according to attribute information of each memory controller in the memory controller linked list.

705: Determine whether the memory controller has gone offline, if yes, execute 704; if no, execute 706.

706: Isolate the memory area corresponding to the memory controller to go offline.

Specifically, the memory controller management module of the memory management apparatus may isolate memory space of the memory controller to go offline, that is, an online memory controller, and prohibit operations, such as memory allocation or data access, from being performed on the memory area of the controller.

707: Determine whether the memory area of the memory controller to go offline is a non-floating area, if yes, execute 711; if no, execute 708.

708: Enable the memory controller to go offline to go offline.

If the memory area of the memory controller to go offline is a floating area, offline processing is directly performed on the memory controller, where the offline processing may be, for example, powering off the memory controller to go offline.

709: Determine whether the memory controller to go offline goes offline successfully, if yes, execute 701; if no, execute 710.

If the memory controller to go offline goes offline successfully, return to 701 and continue to detect whether a new offline message is received.

710: Fail to go offline.

The memory controller to go offline fails to go offline.

711: Select a proper idle memory area for the memory controller to go offline, if selecting succeeds, execute 712; if selecting does not succeed, execute 710.

If the memory area of the memory controller to go offline is a non-floating area, data migration needs to be performed before the memory controller to go offline goes offline.

Specifically, the memory allocation request message may be sent to the node management module, to request the node management module to allocate a memory controller that has a memory area greater than or equal to the memory area of the offline controller. The node management module allocates memory according to the memory allocation request message. The memory offline method may determine an idle first memory controller that has a memory area greater than or equal to the memory area of the offline controller according to any memory allocation method provided in the foregoing memory allocation method.

712: Migrate the data information in the memory controller to go offline to the idle memory area.

Specifically, the controller management module of the memory management apparatus may instruct the BIOS to perform a memory migration operation, to migrate data in the memory area of the controller to go offline to the first memory area.

713: Determine whether the migration succeeds, if the migration succeeds, execute 714; if the migration does not succeed, execute 710.

714: Record migration information of the memory controller to go offline.

Specifically, the controller management module may record the migration information of the memory controller to go offline, including a correspondence between the offline controller and the first memory area, so that the offline controller may further migrate data from the first memory area to the offline controller according to the migration information record when going online again, which improves the efficiency in accessing the offline controller. The controller management module may store the migration information record in other available controllers of a system.

715: De-isolate the memory area of the memory controller to go offline.

After completing the data migration of the memory controller to go offline, the memory controller management module de-isolates the memory area of the memory controller to go offline.

Further, the node management module may further receive a controller or memory module online message sent by the system. The node management module migrates the data back to the online controller or memory module according to the controller or memory module online message and the migration information record.

Figure 8:
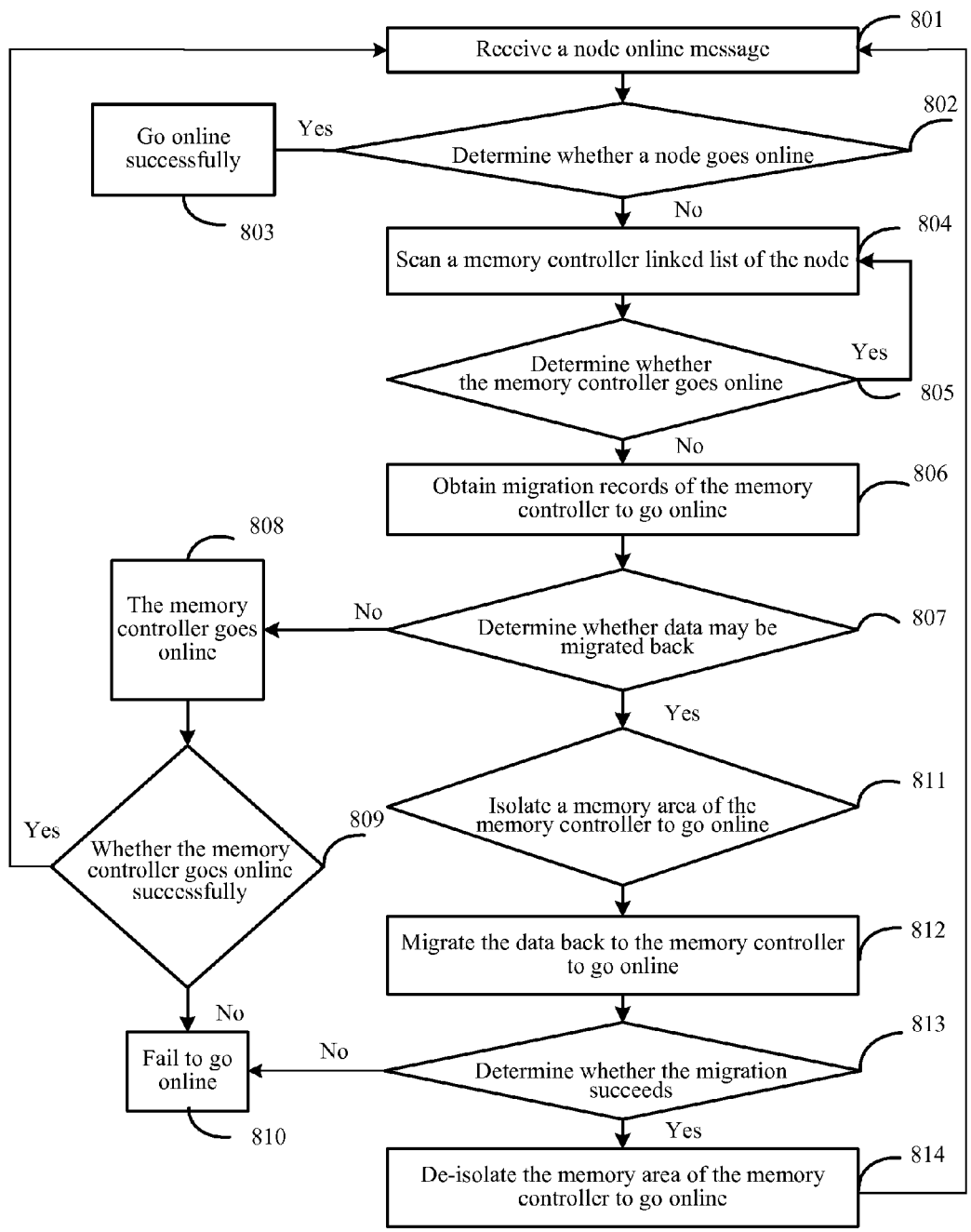
FIG. 8 is a schematic method flow chart of a node online method provided in an embodiment of the present invention.

FIG. 8 is a schematic method flow chart of a node online method provided in the embodiment of the present invention, and as shown in FIG. 8, the memory online method provided in the embodiment includes the following steps.

801: Receive a node online message.

Specifically, for example, a NUMA system needs more memory space to meet the requirements, in this case, a certain node goes online, a node management module of a memory management apparatus receives the node online message, where the node online message may include an identifier of the online node, and may further include attribute information that whether the online node is a floating area.

802: Determine whether the node has gone online, if yes, execute 803; if no, execute 804.

Specifically, the node management module determines whether the node has gone online by searching for the attribute information of the node. If the node has gone online, execute the following 503; if the node has not gone online, execute 504.

803: Go online successfully.

804: Scan a memory controller linked list of the node.

The node management module searches for the memory control linked list of the node, and determines whether a memory controller goes online one by one according to the attribute information of each memory controller in the memory controller linked list.

805: Determine whether the memory controller has gone online, if yes, execute 804; if no, execute 806.

If the memory controller has gone online, keep searching until an offline memory controller is found, and execute 806.

806: Obtain migration records of the memory controller to go online.

Specifically, the memory controller module of the memory management apparatus may obtain, according to the node identifier of the online node, the migration records saved before the node goes offline.

807: Determine whether data may be migrated back, if no, execute 808; if yes, execute 811.

If the migration records are complete, and original data of the memory controller to go online can be migrated back, execute 811; if the migration records are incomplete, or the original data of the memory controller to go online is damaged and cannot be migrated back, execute 808.

808: The memory controller goes online.

Enable the memory controller to go online to go online.

809: Determine whether the memory controller goes online successfully, if successfully, execute 801; if unsuccessfully, execute 810.

810: Fail to go online.

811: Isolate a memory area of the memory controller to go online.

Specifically, the memory controller management module of the memory management apparatus may isolate the memory space of the memory controller to go online, and prohibit operations, such as memory allocation or data access, from being performed on the memory area of the controller.

812: Migrate the data back to the memory controller to go online.

According to the migration records, by using a BIOS, the original data of the memory controller to go online is migrated back to the memory controller to go online.

813: Determine whether the migration succeeds, if the migration succeeds, execute 814; if the migration does not succeed, execute 810.

814: De-isolate the memory area of the memory controller to go online.

It can be seen that, in a memory management manner of adding a layer according to the embodiment of the present invention, the memory management area meeting the requirements may be found rapidly when a large number of nodes and a large number of memory systems do not have sufficient memory to be allocated, instead of going through the whole memory area linked list, which improves the memory allocation efficiency.

Figure 9A:
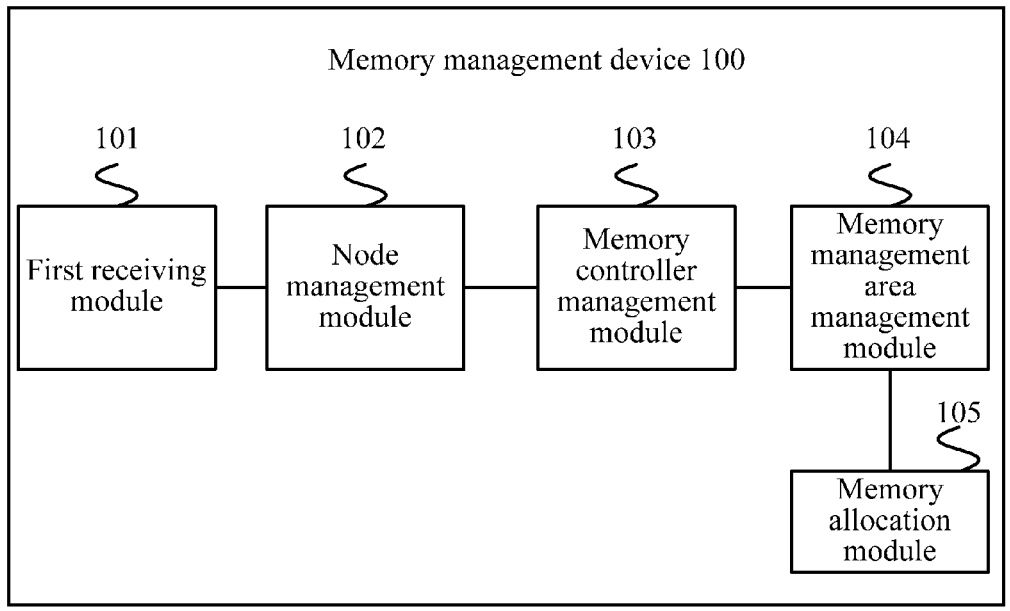
FIG. 9a to FIG. 9d are schematic logic structural diagrams of memory management apparatuses provided in embodiments of the present invention.

FIG. 9a is a schematic logic structural diagram of a memory management apparatus provided in the embodiment of the present invention, and as shown in FIG. 9a, a memory management apparatus 100 in the embodiment includes:

a first receiving module 101, configured to receive a memory allocation request message sent by a processor, where the memory allocation request message includes memory demand information, and send the memory allocation request message to a node management module 102;

the node management module 102, configured to receive the memory allocation request message sent by the first receiving module 101, and determine, according to the memory demand information in the memory allocation request message and memory attribute information of a local node of the processor, whether a memory unit corresponding to the local node meets the memory demand information;

a memory controller management module 103, configured to, if the memory unit corresponding to the local node of the processor meets the memory demand information, determine a memory controller meeting the memory demand information and in the local node according to the memory demand information and first management information corresponding to the local node, where the first management information includes an identifier of a memory controller in the local node and memory attribute information of the memory controller, and send the identifier of the memory controller meeting the memory demand information to a memory management area management module 104;

the memory management area management module 104, configured to receive the identifier of the memory controller meeting the memory demand information and sent by the memory controller management module 103, determine at least one piece of second management information corresponding to the memory controller according to the identifier of the memory controller, determine a memory management area meeting the memory demand information and in the memory controller according to the memory demand information and the at least one piece of second management information, where the second management information includes an identifier of a memory unit corresponding to the memory controller and attribute information of the memory unit, and send an identifier of the memory management area meeting the memory demand information to a memory allocation module 105; and the memory allocation module 105, configured to receive the identifier of the memory management area meeting the memory demand information and sent by the memory management area management module 104, and allocate memory space corresponding to the memory management area to the processor according to the identifier of the memory management area.

In an implementation manner, the memory management area management module 104 is specifically configured to: determine the first second management information corresponding to the memory controller according to the identifier of the memory controller meeting the memory demand information, and determine the memory management area meeting the memory demand information and in the memory controller according to the memory demand information and the first second management information, where the first second management information includes an identifier of a memory management area corresponding to the memory controller and memory attribute information of the memory management area.

In another implementation manner, the memory management area management module 104 specifically includes:

a memory module management unit, configured to determine the first second management information corresponding to the memory controller according to the identifier of the memory controller meeting the memory demand information, and determine a memory module meeting the memory demand information and in the memory controller according to the memory demand information and the first second management information, where the first second management information includes an identifier of a memory module corresponding to the memory controller and memory attribute information of the memory module; and a memory management area management unit, configured to determine second second management information corresponding to the memory module according to the identifier of the memory module meeting the memory demand information, and determine the memory management area meeting the memory demand information and in the memory module according to the memory demand information and the second second management information, where the second second management information includes an identifier of a memory management area corresponding to the memory module and the memory attribute information of the memory management area.

Figure 9B:
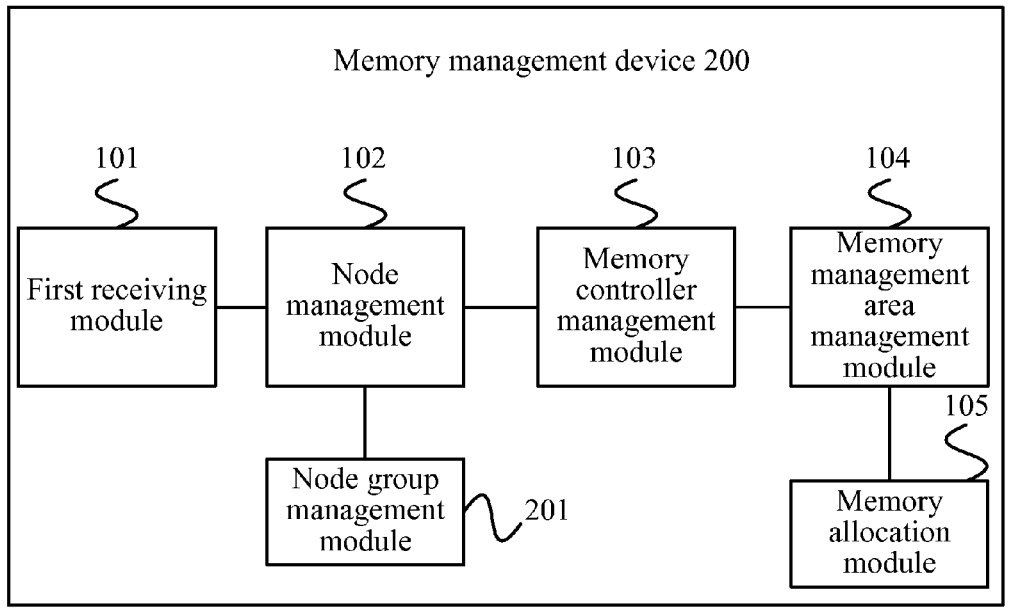

Further, as shown in FIG. 9*b*, a memory management apparatus 200 provided in the embodiment of the present invention further includes:

a node group management module 201, configured to, if the memory unit corresponding to the local node of the processor does not meet the memory demand information, determine a node group meeting the memory demand information according to the memory demand information and fifth management information, where the fifth management information includes an identifier of a node group and memory attribute information of the node group; and a node management module 102, further configured to determine sixth management information corresponding to the node group according to the identifier of the node group meeting the memory demand information, and determine a node meeting the memory demand information and in the node group according to the memory demand information and the sixth management information, where the sixth management information includes an identifier of a node in the node group and memory attribute information of the node.

Figure 9C:
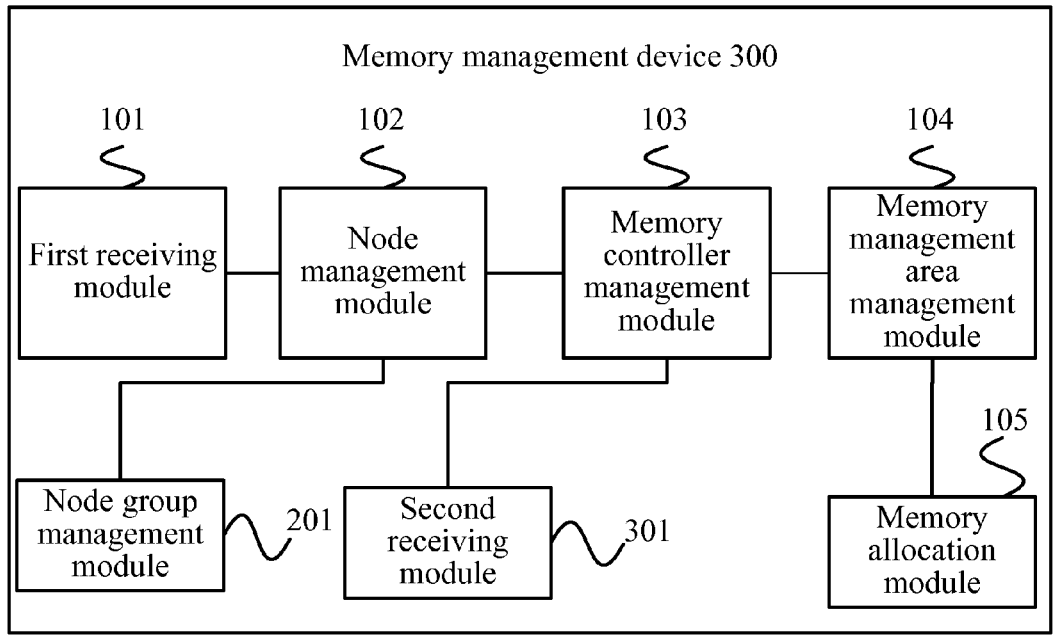

Further, as shown in FIG. 9*c*, a memory management apparatus 300 provided in the embodiment of the present invention further includes:

a second receiving module 301, configured to receive a memory controller offline message sent by the processor, where the memory controller offline message includes an identifier of a memory controller to go offline, and send the memory controller offline message to the memory controller management module; and the memory controller management module 103 is further configured to receive the memory controller offline message sent by the second receiving module 301, and obtain, according to the identifier of the memory controller to go offline, a type of a memory area corresponding to the memory controller to go offline; if the type of the memory area is a non-floating area, migrate data information in the memory area corresponding to the memory controller to go offline to an idle memory area, and record the identifier of the memory controller to go offline and memory migration information corresponding to the memory controller; and perform offline processing on the memory controller to go offline.

Further, before migrating the data information in the memory area corresponding to the memory controller to go offline to the idle memory area, the memory controller management module 103 is further configured to perform isolation processing on the memory area corresponding to the memory controller to go offline. Before performing the offline processing on the memory controller to go offline, the memory controller management module 103 is further configured to perform de-isolation processing on the memory area corresponding to the memory controller to go offline.

Figure 9D:
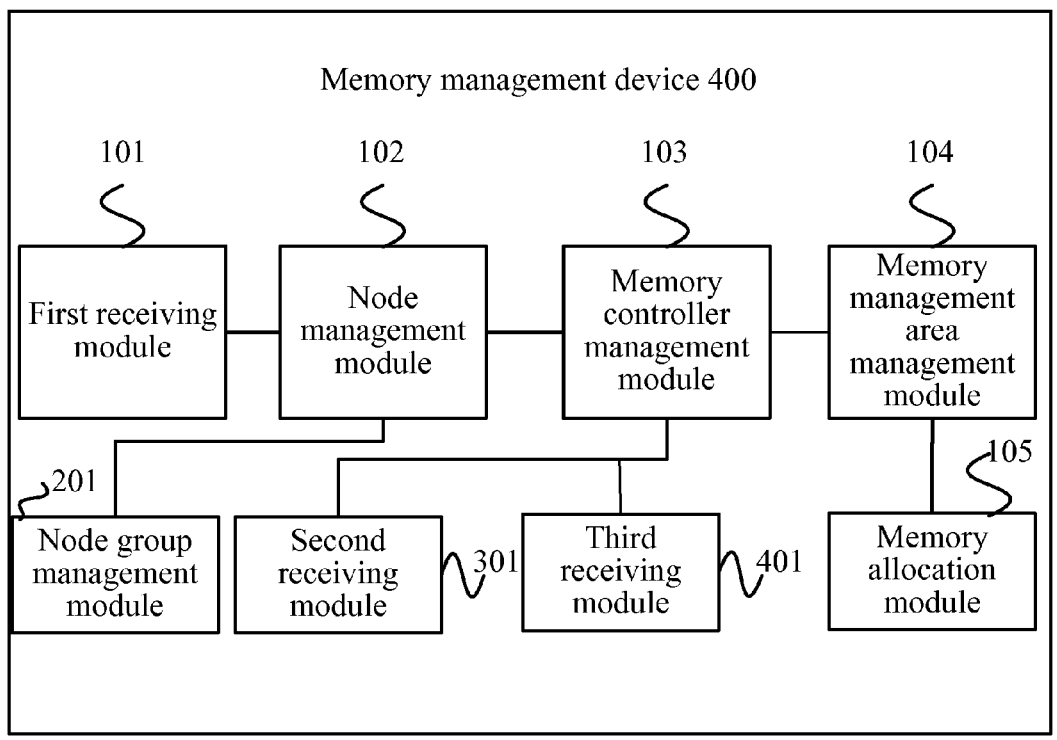

Further, as shown in FIG. 9*d*, a memory management apparatus 400 provided in the embodiment of the present invention further includes:

a third receiving module 401, configured to receive a memory controller online message sent by the processor, where the memory controller online message includes an identifier of a memory controller to go online, and send the memory controller offline message to the memory controller management module; and the memory controller management module 103 is further configured to receive the memory controller offline message sent by the third receiving module, and obtain, according to the identifier of the memory controller to go online, memory migration information of the memory controller to go online; migrate data information in a memory area corresponding to the memory controller to go online back to the memory area corresponding to the memory controller to go online according to the memory migration information of the memory controller to go online; and perform online processing on the memory controller to go online.

Further, before migrating the data information in the memory area corresponding to the memory controller to go online back to the memory area corresponding to the memory controller to go online according to the memory migration information of the memory controller to go online, the memory controller management module 103 is further configured to perform isolation processing on the memory area corresponding to the memory controller to go online. Before performing the online processing on the memory controller to go online, the memory controller management module 103 is further configured to perform de-isolation processing on the memory area corresponding to the memory controller to go online.

For specific implementation of the memory management apparatus provided in the embodiment of the present invention, reference may be made to the foregoing method embodiments, and details are not described herein again.

It should be noted that, module division in the embodiments shown in FIG. 9 are just described as examples, and the related functional modules may be integrated or may also be further divided, for example, the first receiving module 101, the second receiving module 301 and the third receiving module 401 may be integrated into one functional module receiving different information. According to the functional module division disclosed in the embodiment of the present invention, persons skilled in the prior art may easily come up with other manners for dividing the functional modules, therefore, the module division is not limited according to the embodiment of the present invention.

Figure 10:
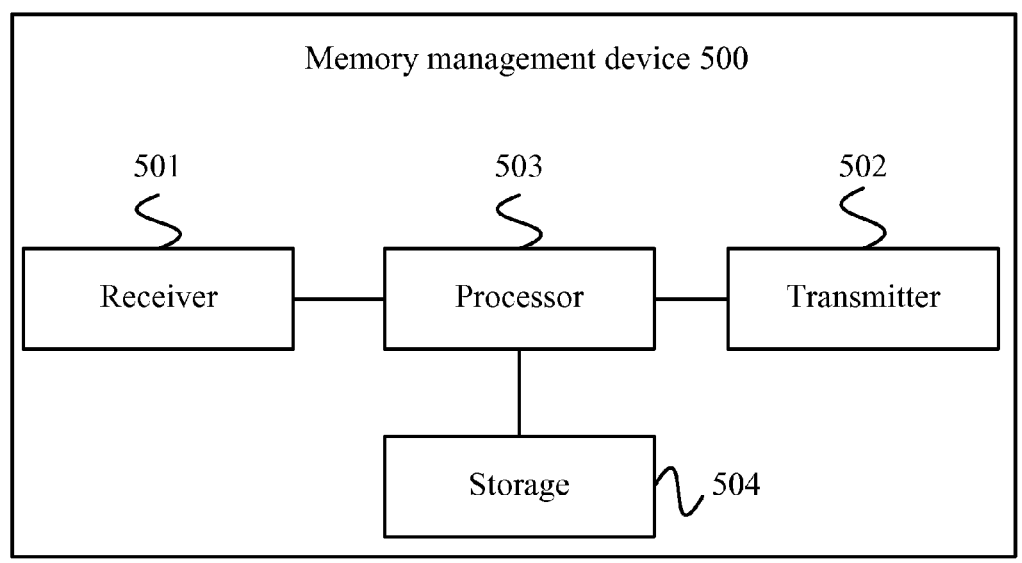
FIG. 10 is a schematic logic structural diagram of another memory management apparatus provided in an embodiment of the present invention.

As shown in FIG. 10, FIG. 10 is a schematic logic structural diagram of another memory management apparatus provided in an embodiment of the present invention, and the memory management apparatus 500 may be implemented as a computer system. A receiver 501 and a transmitter 502 are configured to communicate with other apparatuses or systems except the memory management apparatus. A storage 504 is configured to store data, which specifically includes application program data, result data generated after processor execution or data required for the processor execution. A processor 503 is configured to execute a memory management method provided in the embodiment of the present invention, such as a memory allocation method, and memory online and offline methods.

In an implementation manner, the storage 504 is configured to store an application program used to implement any memory management method provided in the embodiment of the present invention; the processor 503 is configured to read and execute the application program in the storage 504.

Using a memory allocation method as an example: the receiver 501 is configured to receive a memory allocation request message sent by a processor of a certain node (such as a certain server in a NUMA system), where the memory allocation request message includes memory demand information.

In an implementation manner, the processor 503 determines, according to the memory demand information and memory attribute information of a local node of the processor, whether a memory unit corresponding to the local node meets the memory demand information; if the memory unit corresponding to the local node of the processor meets the memory demand information, determines a memory controller meeting the memory demand information and in the local node according to the memory demand information and first management information corresponding to the local node, where the first management information includes an identifier of a memory controller in the local node and memory attribute information of the memory controller; determines first second management information corresponding to the memory controller according to the identifier of the memory controller meeting the memory demand information, and determines a memory management area meeting the memory demand information and in the memory controller according to the memory demand information and the first second management information, where the first second management information include an identifier of a memory management area corresponding to the memory controller and memory attribute information of the memory management area; and allocates memory space corresponding to the memory management area to the processor according to the identifier of the memory management area meeting the memory demand information.

In another implementation manner, the processor 503 determines the first second management information corresponding to the memory controller according to the identifier of the memory controller meeting the memory demand information, determines a memory module meeting the memory demand information and in the memory controller according to the memory demand information and the first second management information, where the first second management information include an identifier of a memory module corresponding to the memory controller and memory attribute information of the memory module; determines second second management information corresponding to the memory module according to the identifier of the memory module meeting the memory demand information, and determines a memory management area meeting the memory demand information and in the memory module according to the memory demand information and the second second management information, where the second second management information includes an identifier of a memory management area corresponding to the memory module and the memory attribute information of the memory management area.

Further, the processor is further configured to, if the memory unit corresponding to the local node of the processor does not meet the memory demand information, determine a node group meeting the memory demand information according to the memory demand information and third management information, where the third management information includes an identifier of a node group and memory attribute information of the node group; determine fourth management information corresponding to the node group according to the identifier of the node group meeting the memory demand information, and determine a node meeting the memory demand information and in the node group according to the memory demand information and the fourth management information, where the fourth management information includes an identifier of a node in the node group and memory attribute information of the node.

The transmitter 502 is configured to send the memory allocation request message to other nodes except the memory controller or the node where the memory controller is located. Specifically, when the processor determines that a node meeting the memory demands is not a node where the memory controller is located, the memory allocation request message is sent through the transmitter of the memory controller to the node meeting the memory demands, then, a process for determining the memory management area is described in the foregoing embodiment, and details are not described herein again.

In addition, the memory management apparatus provided in the embodiment of the present invention may be further configured to execute any memory online method or any memory offline method provided in the foregoing embodiment.

Using one memory online method as an example: the receiver 501 is configured to receive a memory controller offline message sent by a processor of a certain node, where the memory controller offline message includes an identifier of a memory controller to go offline. The processor 503 obtains, according to the identifier of the memory controller to go offline, a type of a memory area corresponding to the memory controller to go offline; if the type of the memory area is a non-floating area, migrates data information in the memory area corresponding to the memory controller to go offline to an idle memory area, and records the identifier of the memory controller to go offline and memory migration information corresponding to the memory controller; and performs offline processing on the memory controller to go offline.

Using one memory offline method as an example: the receiver 501 is configured to receive a memory controller online message sent by a processor of a certain node, where the memory controller online message includes an identifier of a memory controller to go online. The processor 503 obtains, according to the identifier of the memory controller to go online, memory migration information of the memory controller to go online; migrates, according to the memory migration information of the memory controller to go online, the data information in the memory area corresponding to the memory controller to go online back to a memory area corresponding to the memory controller to go online; and performs online processing on the memory controller to go online.

An application program stored in the storage 504 may be divided into the functional modules according to the foregoing apparatus embodiments, or, module division may not be performed or other module division manner may be adopted, which is not limited according to the embodiment of the present invention.

It should be noted that, all the modules of the computer system provided in FIG. 10 are connected through the processors, however, in some other embodiments of the present invention, all the modules, including the processors, may be connected through a bus. The bus may be one or more communications lines.

With reference to management technologies, such as memory allocation and migration in each layer, a multi-layer memory management manner in the memory management apparatus put forward by the embodiment of the present invention implements an efficient application of memory RAS technologies, such as memory mirroring, memory protection and rapid memory recovery.

Figure 11:
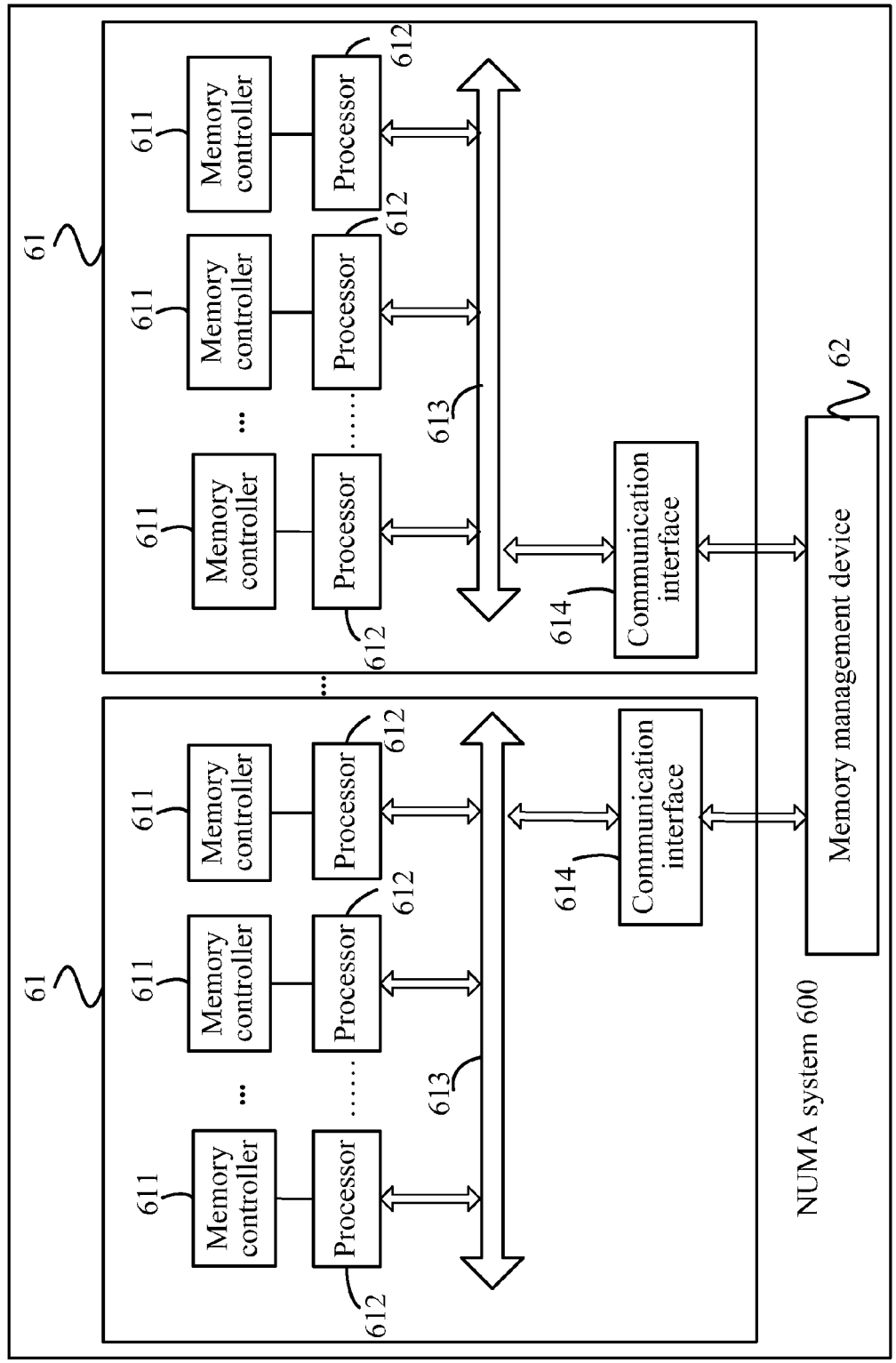
FIG. 11 is a schematic logic structural diagram of a NUMA system provided in an embodiment of the present invention.

FIG. 11 is a schematic logic structural diagram of a NUMA system provided in the embodiment of the present invention. As shown in FIG. 11, the NUMA system 600 includes at least one node 61 and a memory management apparatus 62. The node 61 includes at least one memory controller 611, at least one processor 612 and a bus 613. A communications connection exists between the memory controller 611 and the processor 612. The bus 613 may be an Industry Standard Architecture (ISA) bus, a Peripheral Component Interconnection (PCI) bus or an Extended Industry Standard Architecture (EISA) bus. The bus may be one or more physical lines. When the bus is multiple physical lines, the bus may be divided into an address bus, a data bus, a control bus and the like. In other embodiments, the processor and the memory controller may also be directly connected instead of by using the bus.

The memory management apparatus 62 in the NUMA system 600 provided in the embodiment of the present invention exists as an independent computer system. The memory management apparatus 62 communicates with multiple nodes of the NUMA system through a communications interface 614 in the node 61. The "node" herein is not necessarily one physical host, which may be multiple physical hosts. In some other embodiments of the present invention, the memory management apparatus 62 may also be located on one node of the NUMA system, and communicates with other nodes through the communications interface of the node.

Specifically, one node 61 includes at least one memory controller 611. Any processor 612 in the NUMA system 600 may access any memory controller 611. The processor 612 in the same processing node shares the memory controller 611 of the local node through the bus 613. Different nodes may mutually access the memory controller 611 through the memory management apparatus 62.

The memory management apparatus 62 may be any memory management apparatus according to the foregoing memory management apparatus embodiments, configured to receive a memory allocation request message sent by the processor, where the memory allocation request message includes memory demand information; determine, according to the memory demand information and memory attribute information of a local node of the processor, whether a memory unit corresponding to the local node meets the memory demand information; if the memory unit corresponding to the local node of the processor meets the memory demand information, determine a memory controller meeting the memory demand information and in the local node according to the memory demand information and first management information corresponding to the local node, where the first management information includes an identifier of a memory controller in the local node and memory attribute information of the memory controller; determine at least one piece of second management information corresponding to the memory controller according to the identifier of the memory controller meeting the memory demand information, and determine a memory management area meeting the memory demand information and in the memory controller according to the memory demand information and the at least one piece of second management information, where the second management information includes an identifier of a memory unit corresponding to the memory controller and memory attribute information of the memory unit; and allocate memory space corresponding to the memory management area to the processor according to an identifier of the memory management area meeting the memory demand information.

For other specific implementation, reference may be made to the foregoing method embodiments or apparatus embodiments of the present invention, and details are not described herein again.

It can be seen that, according to the memory management method, the memory management apparatus and the NUMA system provided in the embodiments of the present invention, the memory allocation request message sent by the processor is received, whether the memory controller meeting the memory demand information exists in the local node is determined according to the memory demand information in the memory allocation request message, the memory controller meeting the memory demand information is determined in the local node meeting the memory demand information, the memory management area meeting the memory demand information is determined in the memory controller meeting the memory demand information, and the memory management area meeting the memory demand information is allocated to the processor of the memory allocation request message. Therefore, the memory controller and the memory management area do not need to be determined in the node that does not meet requirements, thereby a storing area meeting the requirements can be rapidly found, and the memory allocation efficiency is improved; further, by adding a management layer of the node group and a management layer of the memory module, the embodiment of the present invention further elaborates management of the storing area, and improves the memory allocation efficiency.

Further, by adding a memory controller management module by the memory management apparatus provided by the embodiment of the present invention, and with reference to a memory migration technology, the embodiment of the present invention solves the technical problem of hot plug of any memory, and also has a small impact on system performance. After the memory is hot plugged, a memory migration record is automatically identified, and the memory that is migrated during the hot plug is selected to migrate back locally, reducing a remote access delay.

Further, the memory management apparatus put forward by the embodiment of the present invention implements an effective application of memory RAS technologies, such as memory mirroring, memory protection and rapid memory recovering through multiple-layer memory management and with reference to memory allocation and freeing management technology in each layer.

It should be noted that, the apparatus embodiments are merely exemplary. Units described as separate components may be or may not be physically separated. Components shown as units may be or may not be physical units, that is, may be integrated in one place, or distributed to a plurality of network units. Some or all of the modules may be selected to achieve the objective of the solution of the embodiment according to actual demands. In addition, in drawings of the apparatus embodiments of the present invention, a connection relationship between the modules indicates that they have a communications connection, which may be specifically implemented as one or more communications buses or signal lines. Persons of ordinary skill in the art can understand and implement the present invention without creative efforts.

The embodiments in the specification are described by adopting a progressive manner. For a similar part between the embodiments, reference may be made to each other. What is emphasized in each embodiment is different from other embodiments. In particular, as for the apparatus and system embodiments, because they are basically similar to the method embodiments, the apparatus and system embodiments are described more briefly. As for a related part, reference may be made to a part of descriptions of the method embodiments.

Through the foregoing description of the implementation, it is clear to persons skilled in the art that the present invention may be accomplished by using software plus a necessary universal hardware, or by using special hardware, including an application-specific integrated circuit, a special CPU, a special storage, special components and parts and the like. Generally, functions performed by computer programs may be easily performed by corresponding hardware. Moreover, there are various specific hardware structures used to perform the same function, such as an analog circuit, a digital circuit or a dedicated circuit. However, as for the present invention, software program implementation is a better implementation manner in most cases. Based on this, the foregoing technical solution of the present invention or the part that makes contributions to the prior art can be substantially embodied in the form of a software product. The computer software product may be stored in a readable storage medium such as a floppy disk, a USB flash drive, a mobile hard disk drive, a read-only memory (ROM), a random access memory (RAM), magnetic disk or an optical disc, and contain several instructions to instruct computer equipment (for example, a personal computer, a server, or network equipment) to perform the method described in the embodiments of the present invention.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments, or make equivalent replacements to some or all the technical features thereof, without departing from the spirit and scope of the technical solutions of the embodiments of the present invention.

What is claimed is:

1. A memory management method, comprising:
receiving a memory allocation request message sent by a processor, wherein the memory allocation request message comprises memory demand information;
determining, according to the memory demand information and memory attribute information of a local node of the processor, whether a memory unit corresponding to the local node meets the memory demand information;
determining, when the memory unit corresponding to the local node of the processor meets the memory demand information, a memory controller meeting the memory demand information and in the local node according to the memory demand information and first management information corresponding to the local node, wherein the first management information comprises an identifier of a memory controller in the local node and memory attribute information of the memory controller;
determining at least one piece of second management information corresponding to the memory controller according to the identifier of the memory controller meeting the memory demand information, and determining a memory management area meeting the memory demand information and in the memory controller according to the memory demand information and the at least one piece of second management information, wherein the second management information comprises an identifier of a memory unit corresponding to the memory controller and attribute information of the memory unit; and
allocating memory space corresponding to the memory management area to the processor according to an identifier of the memory management area meeting the memory demand information.

2. The method according to claim 1, wherein determining the at least one piece of second management information corresponding to the memory controller according to the identifier of the memory controller meeting the memory demand information, and determining the memory management area meeting the memory demand information and in the memory controller according to the memory demand information and the at least one piece of second management information comprises:
 determining first second management information corresponding to the memory controller according to the identifier of the memory controller meeting the memory demand information, and determining the memory management area meeting the memory demand information and in the memory controller according to the memory demand information and the first second management information, wherein the first second management information comprises an identifier of a memory management area corresponding to the memory controller and memory attribute information of the memory management area.

3. The method according to claim 1, wherein determining the at least one piece of second management information corresponding to the memory controller according to the identifier of the memory controller meeting the memory demand information, and determining the memory management area meeting the memory demand information and in the memory controller according to the memory demand information and the at least one piece of second management information comprises:
 determining first second management information corresponding to the memory controller according to the identifier of the memory controller meeting the memory demand information, and determining a memory module meeting the memory demand information and in the memory controller according to the memory demand information and the first second management information, wherein the first second management information comprises an identifier of a memory module corresponding to the memory controller and memory attribute information of the memory module; and
 determining second second management information corresponding to the memory module according to the identifier of the memory module meeting the memory demand information, and determining the memory management area meeting the memory demand information and in the memory module according to the memory demand information and the second second management information, wherein the second second management information comprises an identifier of a memory management area corresponding to the memory module and memory attribute information of the memory management area.

4. The method according to claim 1, further comprising:
 determining, when the memory unit corresponding to the local node of the processor does not meet the memory demand information, a node group meeting the memory demand information according to the memory demand information and third management information, wherein the third management information comprises an identifier of a node group and memory attribute information of the node group; and
 determining fourth management information corresponding to the node group according to the identifier of the node group meeting the memory demand information, and determining a node meeting the memory demand information and in the node group according to the memory demand information and the fourth management information, wherein the fourth management information comprises an identifier of a node in the node group and memory attribute information of the node.

5. The method according to claim 1, further comprising:
 receiving a memory controller offline message sent by the processor, wherein the memory controller offline message comprises an identifier of a memory controller to go offline;
 obtaining, according to the identifier of the memory controller to go offline, a type of a memory area corresponding to the memory controller to go offline;
 migrating, when the type of the memory area is a non-floating area, data information in the memory area corresponding to the memory controller to go offline to an idle memory area, and recording the identifier of the memory controller to go offline and memory migration information corresponding to the memory controller to go offline; and
 performing offline processing on the memory controller to go offline.

6. The method according to claim 5, wherein before migrating the data information in the memory area corresponding to the memory controller to go offline to the idle memory area, the method further comprises:
 performing isolation processing on the memory area corresponding to the memory controller to go offline; and
 before the performing offline processing on the memory controller to go offline, the method further comprises:
 performing de-isolation processing on the memory area corresponding to the memory controller to go offline.

7. The method according to claim 5, wherein a size of the idle memory area is greater than or equal to a size of the memory area corresponding to the memory controller to go offline, and a memory controller corresponding to the idle memory area is not the memory controller to go offline.

8. The method according to claim 5, further comprising:
 receiving a memory controller online message sent by the processor, wherein the memory controller online message comprises an identifier of a memory controller to go online;
 obtaining, according to the identifier of the memory controller to go online, memory migration information of the memory controller to go online;
 migrating, according to the memory migration information of the memory controller to go online, data information in a memory area corresponding to the memory controller to go online back to the memory area corresponding to the memory controller to go online; and
 performing online processing on the memory controller to go online.

9. The method according to claim 8, wherein,
 before the migrating, according to the memory migration information of the memory controller to go online, data information in a memory area corresponding to the memory controller to go online back to the memory area corresponding to the memory controller to go online, the method further comprises:
 performing isolation processing on the memory area corresponding to the memory controller to go online; and
 before the performing online processing on the memory controller to go online, the method further comprises:
 performing de-isolation processing on the memory area corresponding to the memory controller to go online.

10. A memory management apparatus, comprising:
 a first receiving module, configured to receive a memory allocation request message sent by a processor, wherein the memory allocation request message comprises memory demand information, and send the memory allocation request message to a node management module;

the node management module, configured to receive the memory allocation request message sent by the first receiving module, and determine, according to the memory demand information in the memory allocation request message and memory attribute information of a local node of the processor, whether a memory unit corresponding to the local node meets the memory demand information;

a memory controller management module, configured to, when the memory unit corresponding to the local node of the processor meets the memory demand information, determine a memory controller meeting the memory demand information and in the local node according to the memory demand information and first management information corresponding to the local node, wherein the first management information comprises an identifier of a memory controller in the local node and memory attribute information of the memory controller, and send the identifier of the memory controller meeting the memory demand information to a memory management area management module;

the memory management area management module, configured to receive the identifier of the memory controller meeting the memory demand information and sent by the memory controller management module, determine at least one piece of second management information corresponding to the memory controller according to the identifier of the memory controller, determine a memory management area meeting the memory demand information and in the memory controller according to the memory demand information and the at least one piece of second management information, wherein the second management information comprises an identifier of a memory unit corresponding to the memory controller and attribute information of the memory unit, and send an identifier of the memory management area meeting the memory demand information to a memory allocation module; and the memory allocation module, configured to receive the identifier of the memory management area meeting the memory demand information and sent by the memory management area management module, and allocate memory space corresponding to the memory management area to the processor according to the identifier of the memory management area.

11. The apparatus according to claim 10, wherein the memory management area management module is configured to: determine first second management information corresponding to the memory controller according to the identifier of the memory controller meeting the memory demand information, and determine the memory management area meeting the memory demand information and in the memory controller according to the memory demand information and the first second management information, wherein the first second management information comprises an identifier of a memory management area corresponding to the memory controller and memory attribute information of the memory management area.

12. The apparatus according to claim 10, wherein the memory management area management module comprises:

a memory module management unit, configured to determine first second management information corresponding to the memory controller according to the identifier of the memory controller meeting the memory demand information, and determine a memory module meeting the memory demand information and in the memory controller according to the memory demand information and the first second management information, wherein the first second management information comprises an identifier of a memory module corresponding to the memory controller and memory attribute information of the memory module; and a memory management area management unit, configured to determine second second management information corresponding to the memory module according to the identifier of the memory module meeting the memory demand information, and determine the memory management area meeting the memory demand information and in the memory module according to the memory demand information and the second second management information, wherein the second second management information comprises an identifier of a memory management area corresponding to the memory module and the memory attribute information of the memory management area.

13. The apparatus according to claim 10, further comprising:

a node group management module, configured to, when the memory unit corresponding to the local node of the processor does not meet the memory demand information, determine a node group meeting the memory demand information according to the memory demand information and fifth management information, wherein the fifth management information comprises an identifier of a node group and memory attribute information of the node group; and the node management module is further configured to determine sixth management information corresponding to the node group according to the identifier of the node group meeting the memory demand information, and determine a node meeting the memory demand information and in the node group according to the memory demand information and the sixth management information, wherein the sixth management information comprises an identifier of a node in the node group and memory attribute information of the node.

14. The apparatus according to claim 10, further comprising:

a second receiving module, configured to receive a memory controller offline message sent by the processor, wherein the memory controller offline message comprises an identifier of a memory controller to go offline, and send the memory controller offline message to the memory controller management module; and the memory controller management module is further configured to receive the memory controller offline message sent by the second receiving module, and obtain, according to the identifier of the memory controller to go offline, a type of a memory area corresponding to the memory controller to go offline; when the type of the memory area is a non-floating area, migrate data information in the memory area corresponding to the memory controller to go offline to an idle memory area, and record the identifier of the memory controller to go offline and memory migration information corresponding to the memory controller; and perform offline processing on the memory controller to go offline.

15. The apparatus according to claim 14, wherein the memory controller management module is further configured to perform isolation processing on the memory area corresponding to the memory controller to go offline; and perform de-isolation processing on the memory area corresponding to the memory controller to go offline.

16. The apparatus according to claim 14, further comprising:
a third receiving module, configured to receive a memory controller online message sent by the processor, wherein the memory controller online message comprises an identifier of a memory controller to go online, and send the memory controller offline message to the memory controller management module; and
the memory controller management module is further configured to receive the memory controller online message sent by the third receiving module, and obtain, according to the identifier of the memory controller to go online, memory migration information of the memory controller to go online; migrate data information in a memory area corresponding to the memory controller to go online back to the memory area corresponding to the memory controller to go online according to the memory migration information of the memory controller to go online; and perform online processing on the memory controller to go online.

17. The apparatus according to claim 16, wherein,
the memory controller management module is further configured to perform isolation processing on the memory area corresponding to the memory controller to go online; and perform de-isolation processing on the memory area corresponding to the memory controller to go online.

18. A non-transitory computer-readable medium having computer usable instructions stored thereon for execution by a processor, wherein the instructions cause the processor to:
receive a memory allocation request message sent by a processor, wherein the memory allocation request message comprises memory demand information;
determine, according to the memory demand information and memory attribute information of a local node of the processor, whether a memory unit corresponding to the local node meets the memory demand information;
determine, when the memory unit corresponding to the local node of the processor meets the memory demand information, a memory controller meeting the memory demand information and in the local node according to the memory demand information and first management information corresponding to the local node, wherein the first management information comprises an identifier of a memory controller in the local node and memory attribute information of the memory controller;
determine at least one piece of second management information corresponding to the memory controller according to the identifier of the memory controller meeting the memory demand information, and determining a memory management area meeting the memory demand information and in the memory controller according to the memory demand information and the at least one piece of second management information, wherein the second management information comprises an identifier of a memory unit corresponding to the memory controller and attribute information of the memory unit; and
allocate memory space corresponding to the memory management area to the processor according to an identifier of the memory management area meeting the memory demand information.

19. The method according to claim 18, wherein the instructions further cause the processor to determine first second management information corresponding to the memory controller according to the identifier of the memory controller meeting the memory demand information, and determine the memory management area meeting the memory demand information and in the memory controller according to the memory demand information and the first second management information, wherein the first second management information comprises an identifier of a memory management area corresponding to the memory controller and memory attribute information of the memory management area.

20. The method according to claim 18, wherein the instructions further cause the processor to receive a memory controller offline message sent by the processor, wherein the memory controller offline message comprises an identifier of a memory controller to go offline;
obtain, according to the identifier of the memory controller to go offline, a type of a memory area corresponding to the memory controller to go offline;
migrate, when the type of the memory area is a non-floating area, data information in the memory area corresponding to the memory controller to go offline to an idle memory area, and record the identifier of the memory controller to go offline and memory migration information corresponding to the memory controller to go offline; and
perform offline processing on the memory controller to go offline.

* * * * *